United States Patent
Takagi et al.

(10) Patent No.: US 11,409,289 B2
(45) Date of Patent: Aug. 9, 2022

(54) INFORMATION PROCESSING DEVICE, INFORMATION PROCESSING METHOD, AND PROGRAM

(71) Applicants: SONY CORPORATION, Tokyo (JP); SONY MOBILE COMMUNICATIONS INC., Tokyo (JP)

(72) Inventors: Noriaki Takagi, Tokyo (JP); Masahiro Shimase, Kanagawa (JP); Tomoyuki Sonoda, Kanagawa (JP); Daisuke Watanabe, Kanagawa (JP); Kohei Takada, Kanagawa (JP)

(73) Assignees: SONY CORPORATION, Tokyo (JP); SONY MOBILE COMMUNICATIONS. INC, Tokyo (JP)

( * ) Notice: Subject to any disclaimer, the term of this patent is extended or adjusted under 35 U.S.C. 154(b) by 18 days.

(21) Appl. No.: 16/975,580

(22) PCT Filed: Jan. 8, 2019

(86) PCT No.: PCT/JP2019/000212
§ 371 (c)(1),
(2) Date: Aug. 25, 2020

(87) PCT Pub. No.: WO2019/163312
PCT Pub. Date: Aug. 29, 2019

(65) Prior Publication Data
US 2020/0409365 A1    Dec. 31, 2020

(30) Foreign Application Priority Data
Feb. 26, 2018    (JP) .............................. JP2018-032120

(51) Int. Cl.
*G01C 22/00* (2006.01)
*G05D 1/00* (2006.01)
(Continued)

(52) U.S. Cl.
CPC ........... *G05D 1/0088* (2013.01); *A63H 11/00* (2013.01); *G05D 1/0251* (2013.01)

(58) Field of Classification Search
CPC ..... G05D 1/0088; G05D 1/0251; A63H 11/00
(Continued)

(56) References Cited

U.S. PATENT DOCUMENTS 4,921,458 A * 5/1990 Greenwood ........... A63H 11/10
446/101
5,823,845 A * 10/1998 O'Berrigan ............ A63H 11/14
446/234
(Continued)

FOREIGN PATENT DOCUMENTS

CN 1739924 A 3/2006
CN 107589741 A 1/2018
(Continued)

OTHER PUBLICATIONS

Shun Kitamura, Development of a Wheel Drive Type Inverted Pendulum Robot as a Multiobjective Testbed, May 15, 2013 (Year: 2013).*

(Continued)

*Primary Examiner* — Hung Q Nguyen
*Assistant Examiner* — Anthony Donald Taylor, Jr.
(74) *Attorney, Agent, or Firm* — Paratus Law Group, PLLC

(57) ABSTRACT

There is provided an information processing device to realize a rich motion expression of an autonomous mobile object by easier attitude control. The information processing device includes: a motion control unit that controls a motion
(Continued)

of an autonomous mobile object, wherein the autonomous mobile object includes a wheel that can be stored inside a main body and that can be protruded to an outside of the main body, and the motion control unit keeps a standing state by making the wheel protruded to the outside of the main body and performs driving control of the wheel and attitude control of the autonomous mobile object in movement of the autonomous mobile object, and makes the autonomous mobile object remain still in a seated state during a stop thereof by storing the wheel inside the main body is provided.

14 Claims, 23 Drawing Sheets

(51) Int. Cl.
*A63H 11/00* (2006.01)
*G05D 1/02* (2020.01)

(58) Field of Classification Search
USPC ............................................................ 701/26
See application file for complete search history.

(56) References Cited

U.S. PATENT DOCUMENTS

| 6,042,449 | A  | * | 3/2000  | Ishimoto ............. A63H 11/14 446/233 |
| 6,837,327 | B2 | * | 1/2005  | Heinzmann ........... B62D 57/00 180/218 |
| 7,258,591 | B2 | * | 8/2007  | Xu ....................... A63H 15/06 446/273 |
| 9,259,129 | B2 | * | 2/2016  | Jang ................... A47L 9/2805 |
| 9,526,999 | B2 | * | 12/2016 | Lin ........................ A63H 29/20 |
| 2006/0097683 | A1 | * | 5/2006  | Hosoda ................ B62D 57/024 318/568.12 |
| 2015/0274032 | A1 | * | 10/2015 | Nakamura ........... B62K 11/007 701/70 |

FOREIGN PATENT DOCUMENTS

| EP | 0908211 | A2 |   | 4/1999  | |
| JP | S56-084480 | U |   | 7/1981  | |
| JP | H06-171892 | A |   | 6/1994  | |
| JP | H11-104362 | A |   | 4/1999  | |
| JP | 2001-010562 | A |   | 1/2001  | |
| JP | 2001010562 | A | * | 1/2001  | ............ B60K 23/06 |
| JP | 2002-219677 | A |   | 8/2002  | |
| JP | 2002-273068 | A |   | 9/2002  | |
| JP | 2002273068 | A | * | 9/2002  | ............ A63H 11/00 |
| JP | 2012-056001 | A |   | 3/2012  | |
| JP | 2014-144211 | A |   | 8/2014  | |
| JP | WO2018012219 | A1 | * | 1/2018  | ............ A63H 11/00 |
| WO | WO 2018/012219 | A1 |   | 1/2018  | |

OTHER PUBLICATIONS

Kaoru Wakui, Obstacle avoidance of inverted pendulum type two-wheeled robot by dynamic posture control, May 25, 2014 (Year: 2014).*

Shun Kitamura et al., Development of a Wheel Drive Type Inverted Pendulum Robot as a Multiobjective Testbed, Proceedings of the 57$^{th}$ Annual Conference of the Institute of Systems, Control and Information Engineerings (ISCIE), May 15-17, 2013, pp. 14-21, Kobe, Japan.

Kaoru Wakui et al., Obstacle avoidance of inverted pendulum type two-wheeled robot by dynamic posture control, Proceedings of the 2014 JSME Conference on Robotics and Mechatronics, May 25-29, 2014, pp. 10-14, No. 14-2, Toyama, Japan.

* cited by examiner

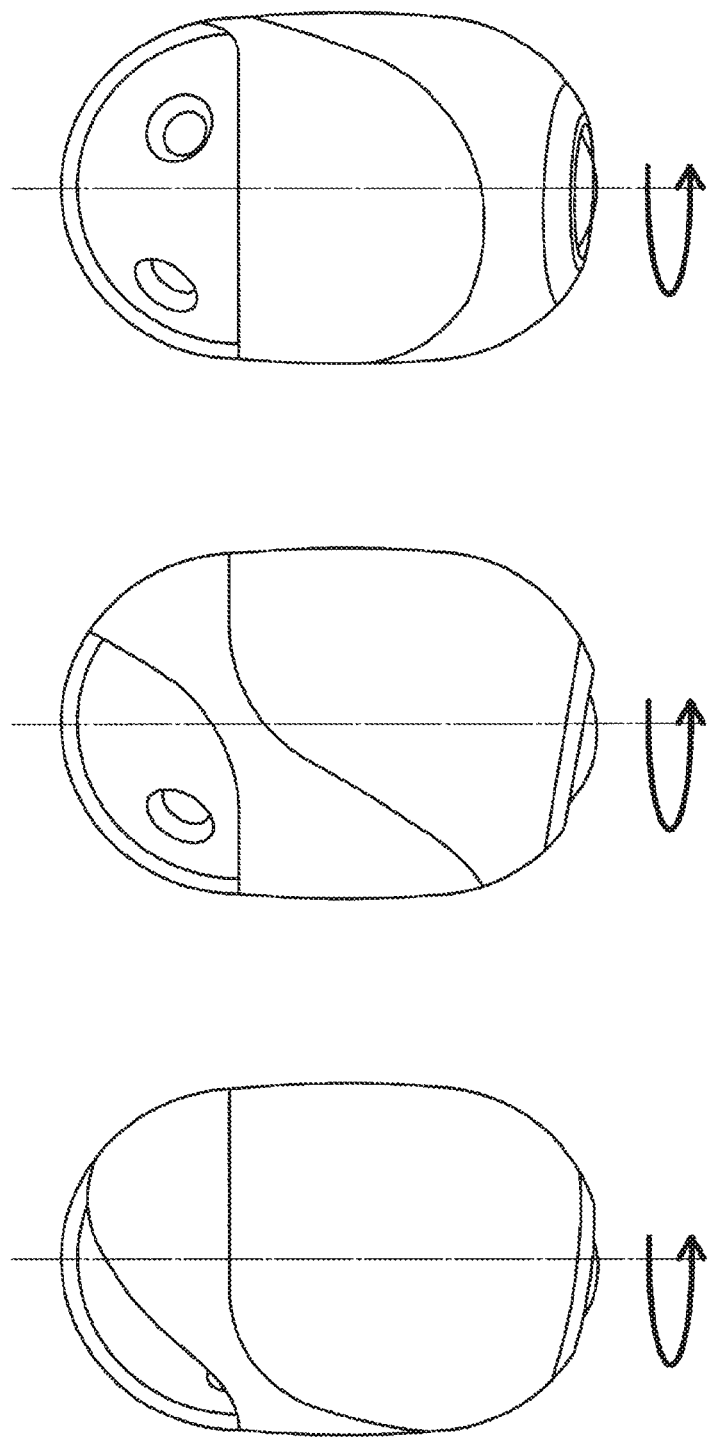

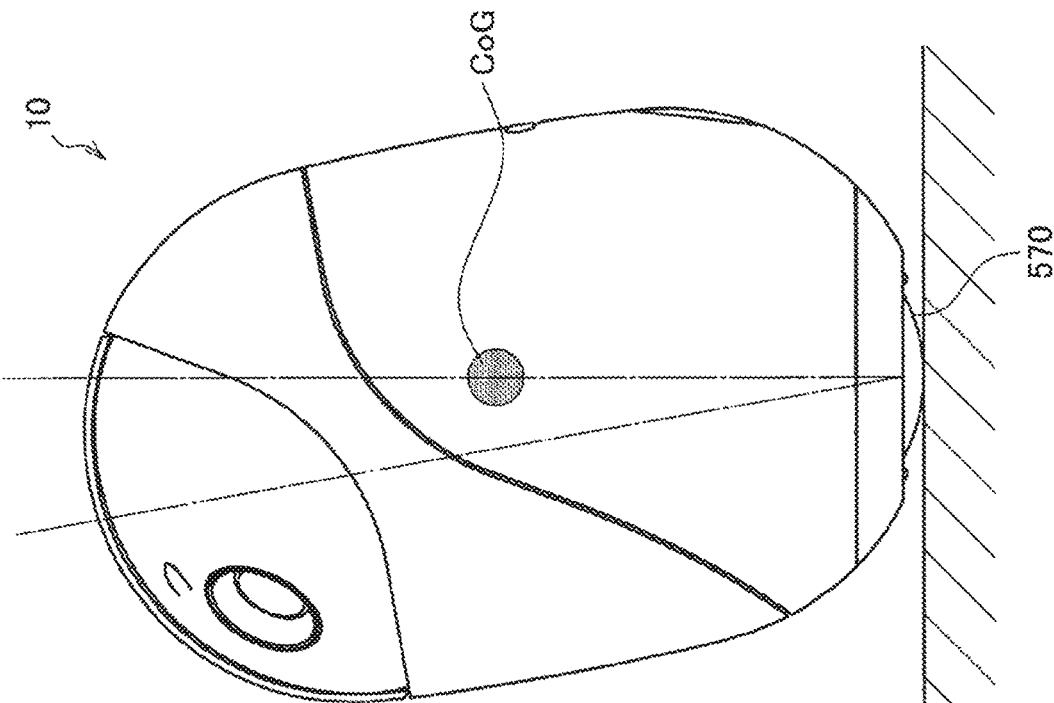
FIG. 15
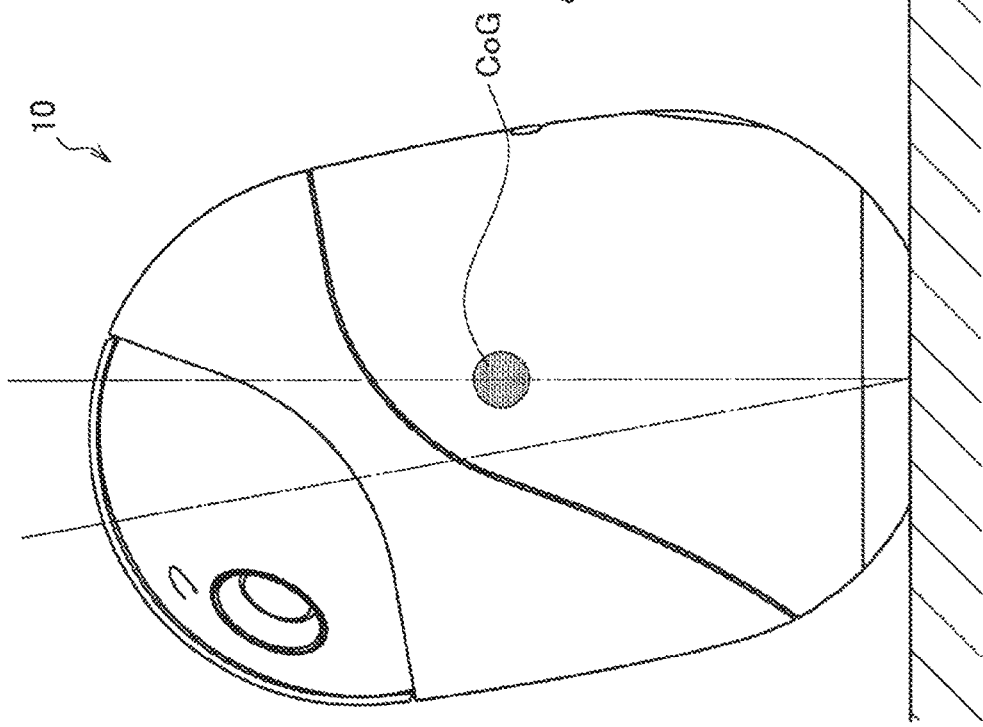

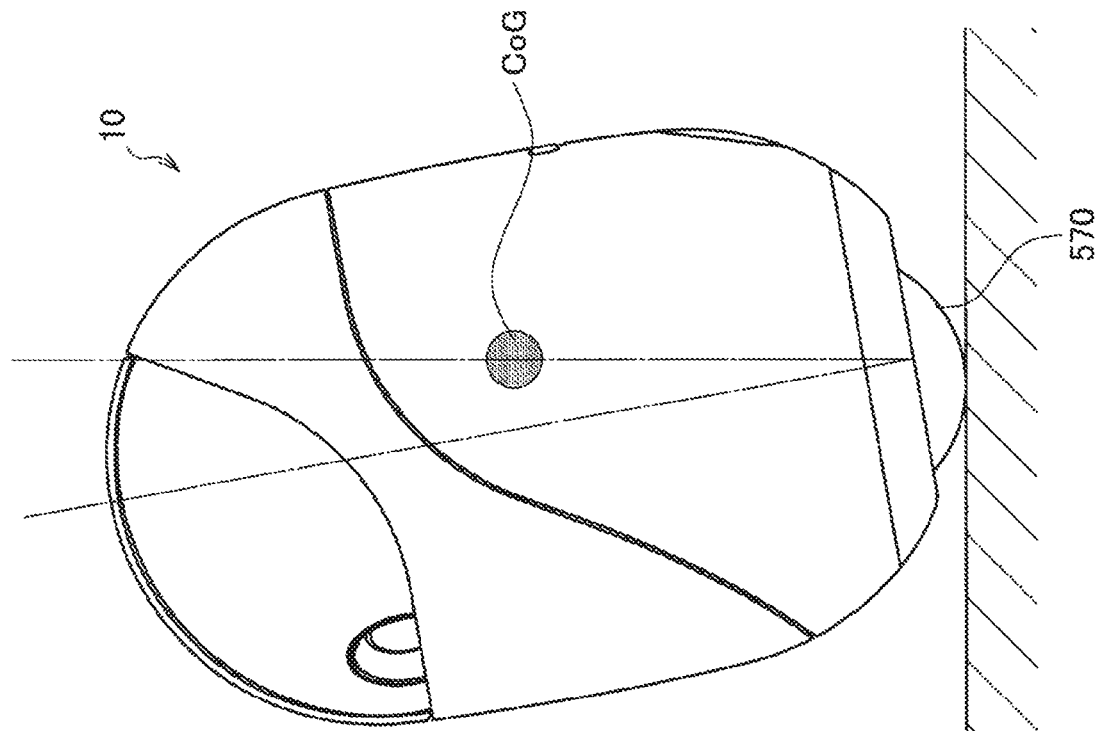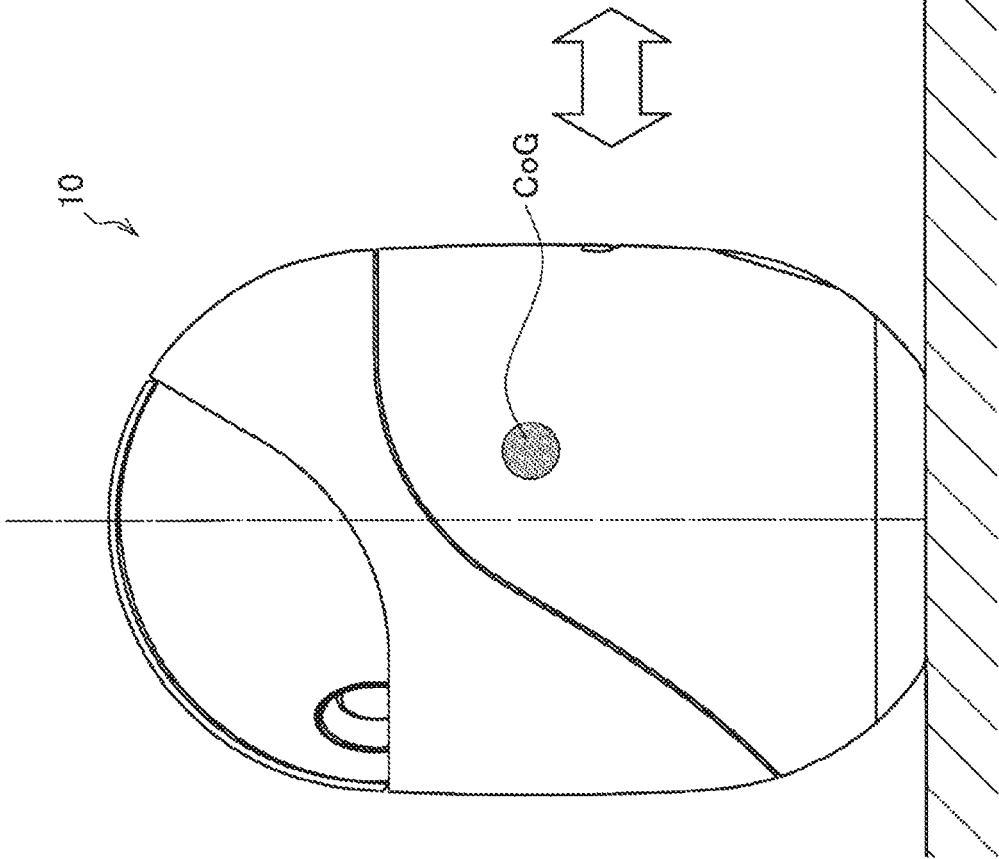
FIG.16

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2019/000212 (filed on Jan. 8, 2019) under 35 U.S.C. § 371, which claims priority to Japanese Patent Application No. 2018-032120 (filed on Feb. 26, 2018), which are all hereby incorporated by reference in their entirety.

FIELD

The present disclosure relates to an information processing device, an information processing method, and a program.

BACKGROUND

Recently, various robotics devices have been developed along with development of technology. The robotics devices described above include an autonomous robotics device that makes a flexible autonomous motion according to a situation of a user or surroundings. For example, a dog-shaped robotics device that performs an information acquisition action as one of autonomous motions is disclosed in Patent Literature 1.

CITATION LIST

Patent Literature

Patent Literature 1: JP 2002-219677 A

SUMMARY

Technical Problem

Incidentally, in an autonomous robotics device as disclosed in Patent Literature 1, attitude control to realize various autonomous motions is important. While attitude control tends to become more difficult as a structure of a robotics device becomes more complicated, it is assumed that a range of motion expression by a robotics device is limited and a user may receive a cold impression in a case where a structure of the robotics device is simplified.

Thus, in the present disclosure, a new and improved information processing device, information processing method, and program capable of realizing rich motion expression of an autonomous mobile object with easier attitude control are proposed.

Solution to Problem

According to the present disclosure, an information processing device is provided that includes: a motion control unit that controls a motion of an autonomous mobile object, wherein the autonomous mobile object includes a wheel that can be stored inside a main body and that can be protruded to an outside of the main body, and the motion control unit keeps a standing state by making the wheel protruded to the outside of the main body and performs driving control of the wheel and attitude control of the autonomous mobile object in movement of the autonomous mobile object, and makes the autonomous mobile object remain still in a seated state during a stop thereof by storing the wheel inside the main body.

Moreover, according to the present disclosure, an information processing method is provided that includes: controlling a motion of an autonomous mobile object, the controlling being performed by a processor, wherein the autonomous mobile object includes a wheel that can be stored inside a main body and that can be protruded to an outside of the main body, and the controlling further includes to keep a standing state by protruding the wheel to the outside of the main body and to perform driving control of the wheel and attitude control of the autonomous mobile object in movement of the autonomous mobile object, and to make the autonomous mobile object remain still in a seated state during a stop thereof by storing the wheel inside the main body.

Moreover, according to the present disclosure, a program is provided that causes a computer to function as an information processing device including a motion control unit that controls a motion of an autonomous mobile object, wherein the autonomous mobile object includes a wheel that can be stored inside a main body and that can be protruded to an outside of the main body, and the motion control unit keeps a standing state by making the wheel protruded to the outside of the main body and performs driving control of the wheel and attitude control of the autonomous mobile object in movement of the autonomous mobile object, and makes the autonomous mobile object remain still in a seated state during a stop thereof by storing the wheel inside the main body.

Advantageous Effects of Invention

According to the present disclosure, rich motion expression of an autonomous mobile object can be realized with easier attitude control, as described above.

Note that the above effect is not necessarily a limitation, and any effect described in the present description or a different effect that can be grasped from the present description may be acquired together with or instead of the above effect.

BRIEF DESCRIPTION OF DRAWINGS

FIG. 13A is a view for describing an effect of a forward-inclined motion of an autonomous mobile object 10 according to the embodiment.

FIG. 15 is a view for describing attitude control during a stop and during a moving motion according to the embodiment.

FIG. 16 is a view for describing the attitude control during a stop and a moving motion according to the embodiment.

DESCRIPTION OF EMBODIMENTS

Figure 1:
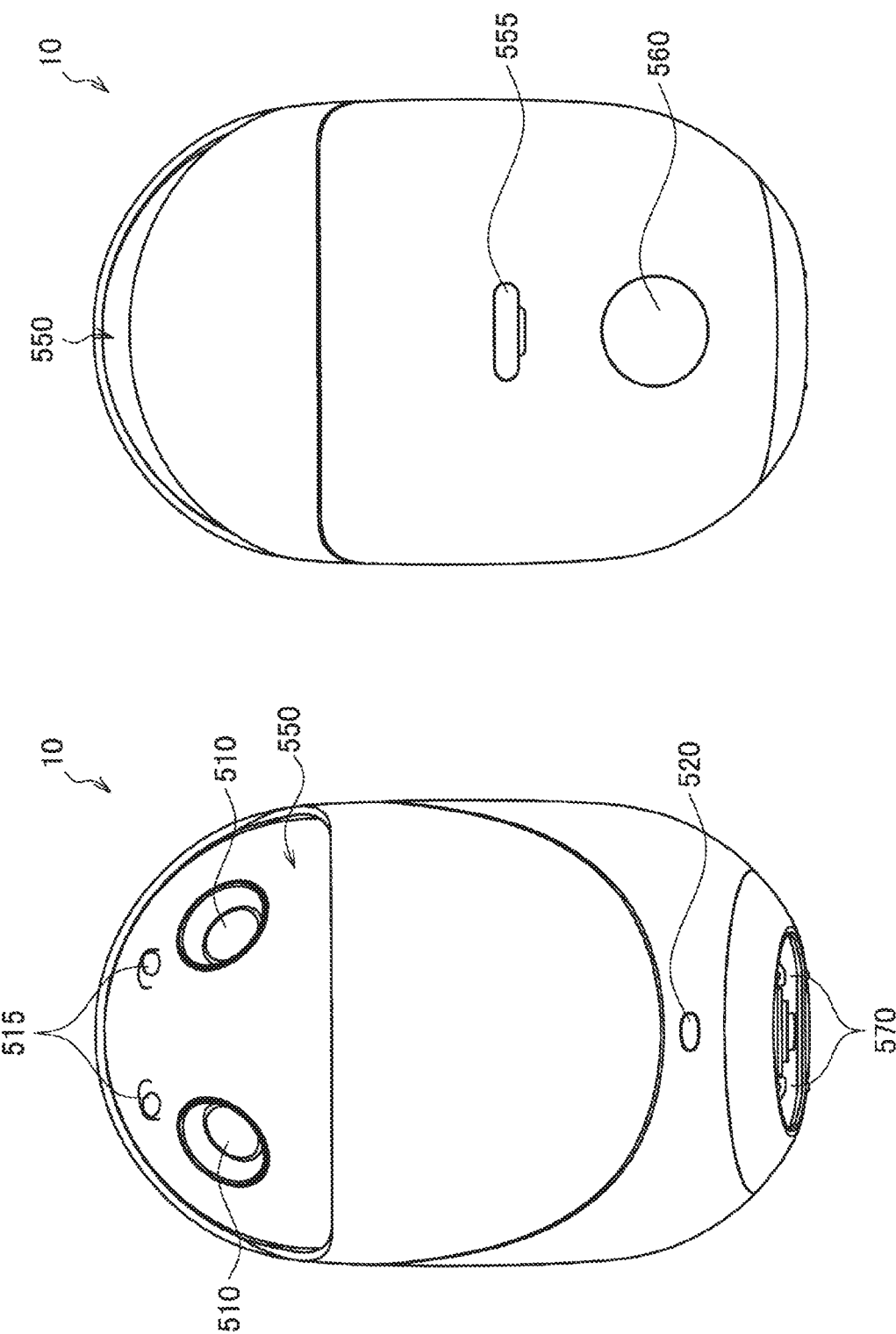
FIG. 1 is a front view and a rear view of an autonomous mobile object according to an embodiment of the present disclosure.

In the following, preferred embodiments of the present disclosure will be described in detail with reference to the attached drawings. Note that in the present description and the drawings, the same sign is assigned to components having substantially the same functional configuration, and redundant description is omitted.

Note that it is assumed that the description will be made in the following order.

1. Embodiment
1.1 Outline
1.2. Configuration example of autonomous mobile object
1.3. Functional configuration example of autonomous mobile object 10
1.4. Detail of attitude control
2. Conclusion

1. EMBODIMENT

<<1.1. Outline>>

First, an outline of an embodiment of the present disclosure will be described. As described above, various robotics devices that make an autonomous motion have been developed. The robotics devices as described above can autonomously execute various motions including movement according to a situation of a user, surroundings, or the self.

Here, in order to realize such an autonomous motion described above, attitude control of a robotics device (hereinafter, also referred to as autonomous mobile object) is important. The attitude control described above, for example, includes gyro control to control a balance of an autonomous mobile object on the basis of angular velocity detected by a gyro sensor included in the autonomous mobile object. According to such control, for example, it is possible to finely adjust an attitude of the autonomous mobile object in such a manner that an unintended fall does not occur.

On the other hand, even in a case where the gyro control is performed, when the autonomous mobile object does not move and stops at a place, a device main body is generally in an unstable wobbling state. Also, a cost of electric power tends to be increased by continuous execution of the gyro control in such a manner that the autonomous mobile object does not fall even during the stop.

A technical idea according to the present disclosure is conceived with a focus on the above point, and one of features thereof is that an autonomous mobile object is brought into a seated state and a contact area with an installation surface is increased during a stop and a main body is made to remain still in a stable state without gyro control. According to such a feature, in a case where movement is not required, it is possible to make the autonomous mobile object remain still firmly at a place, and to effectively reduce power consumption by not performing unnecessary gyro control.

Also, one of features of the autonomous mobile object according to the present embodiment is to make a moving motion such as forward/backward movement, turning movement, or rotational movement in a standing state with a forward-inclined attitude being kept. According to such a feature, even in a case where the autonomous mobile object has a relatively simple outer shape such as a long ellipse body, it is possible to erase an impression as an artificial object by clearly evoking a head and a hip, and to give a user a quote closer to a real life form.

Hereinafter, features of an autonomous mobile object 10 according to the present embodiment and effects of the features will be described in detail.

<<1.2. Configuration Example of Autonomous Mobile Object 10>>

Next, a configuration example of the autonomous mobile object 10 according to an embodiment of the present disclosure will be described. The autonomous mobile object 10 according to the present embodiment may be various devices that make an autonomous motion based on environment recognition. In the following, a case where the autonomous mobile object 10 according to the present embodiment is a long-ellipse body agent-type robotics device that performs autonomous traveling with wheels will be described as an example. The autonomous mobile object 10 according to the present embodiment realizes various communications including information presentation by making an autonomous motion corresponding to a situation of a user, surroundings, or the self, for example. The autonomous mobile object 10 according to the present embodiment may be a small robot having a size and weight in a degree of being easily lifted by a user with one hand.

Figure 2:
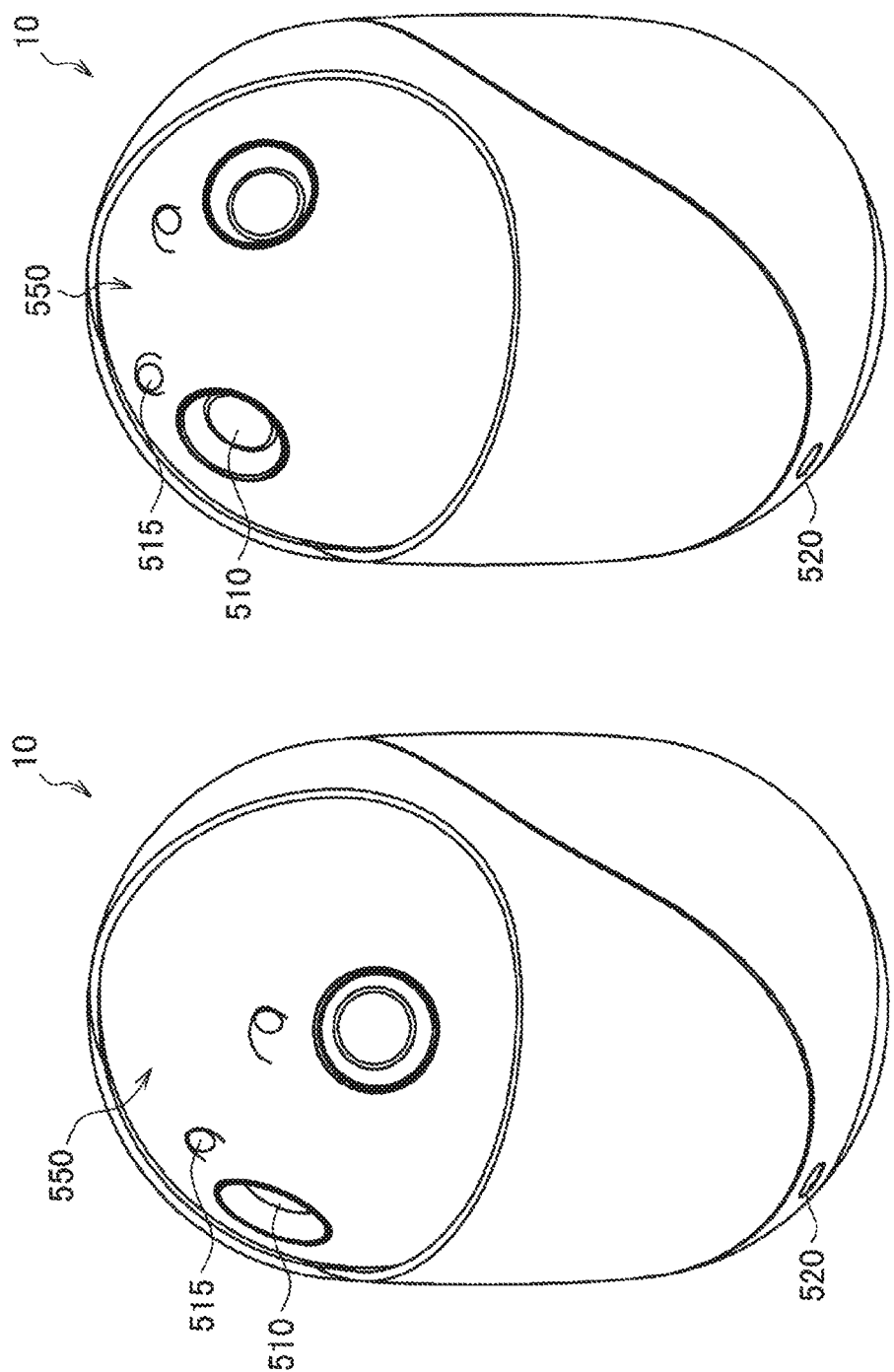
FIG. 2 is a perspective view of the autonomous mobile object according to the embodiment.
Figure 3:
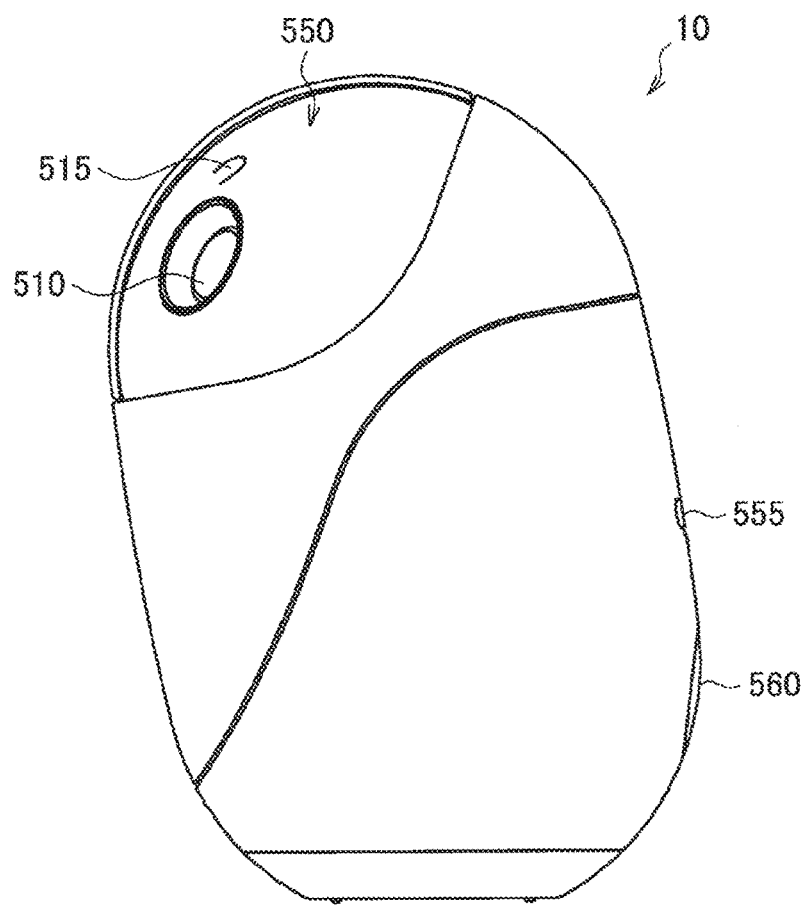
FIG. 3 is a side view of the autonomous mobile object according to the embodiment.
Figure 4:
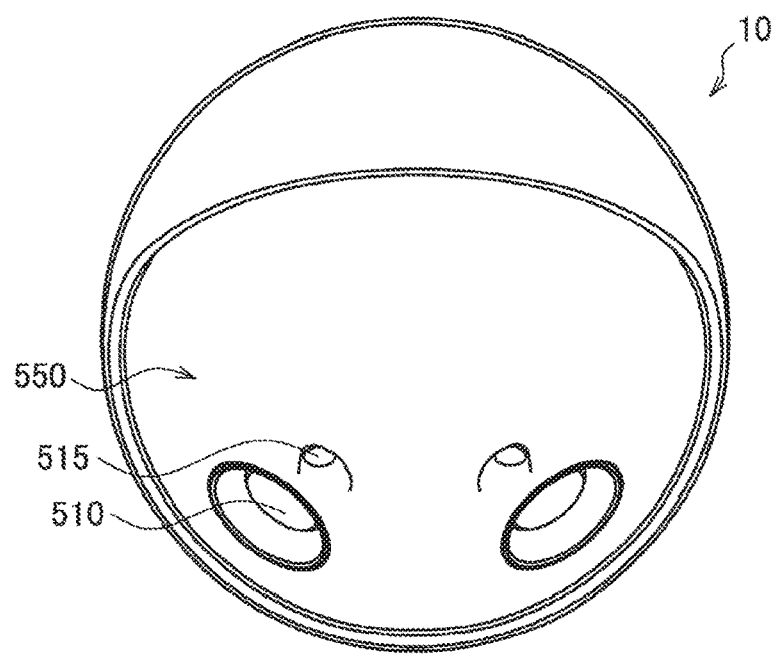
FIG. 4 is a top view of the autonomous mobile object according to the embodiment.
Figure 5:
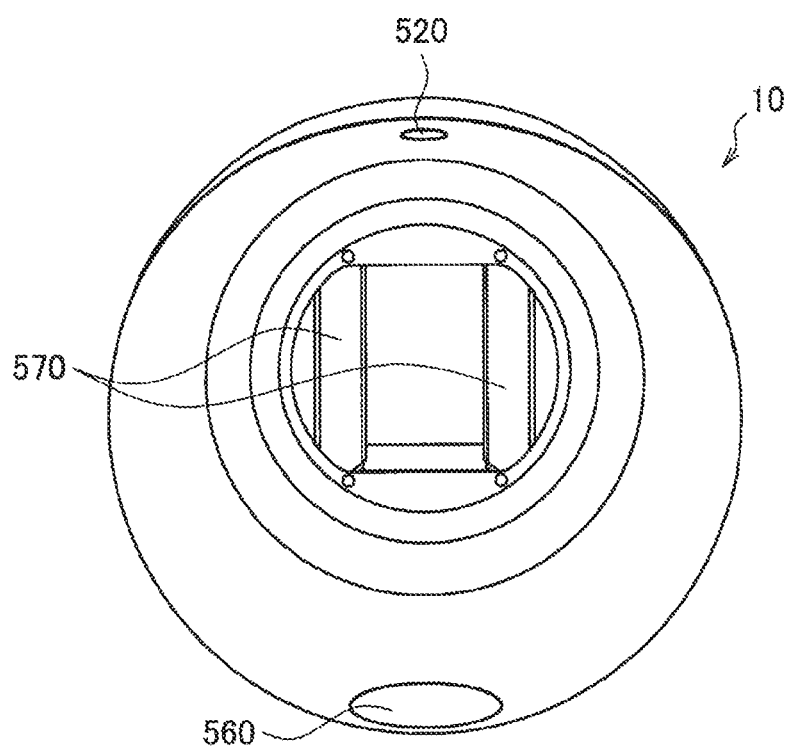
FIG. 5 is a bottom view of the autonomous mobile object according to the embodiment.

First, an example of an exterior of the autonomous mobile object 10 according to the present embodiment will be described with reference to FIG. 1 to FIG. 5. FIG. 1 is a front view and a rear view of the autonomous mobile object 10 according to the present embodiment. Also, FIG. 2 is a perspective view of the autonomous mobile object 10 according to the present embodiment. Also, FIG. 3 is a side view of the autonomous mobile object 10 according to the present embodiment. Also, FIG. 4 and FIG. 5 are respectively a top view and a bottom view of the autonomous mobile object 10 according to the present embodiment.

As illustrated in FIG. 1 to FIG. 4, the autonomous mobile object 10 according to the present embodiment includes two eye parts 510 corresponding to a right eye and a left eye on an upper part of the main body. Each of the eye parts 510 is realized, for example, by an LED or the like and can express a glance, a blink, and the like. Note that the eye parts 510 are not limited to the above example, and may be realized, for example, by single or two independent organic light emitting diodes (OLED).

Also, the autonomous mobile object 10 according to the present embodiment includes two cameras 515 above the eye parts 510. The cameras 515 have a function of imaging a user or a surrounding environment. Also, the autonomous mobile object 10 can realize simultaneous localization and mapping (SLAM) based on an image captured by the cameras 515.

Note that the eye parts 510 and the cameras 515 according to the present embodiment are arranged on a substrate 505 arranged inside an exterior surface. Also, the exterior surface of the autonomous mobile object 10 in the present embodiment is basically formed by utilization of an opaque material. However, a head cover 550 having a transparent or translucent material is provided in a part corresponding to the substrate 505 on which the eye parts 510 and the cameras 515 are arranged. Accordingly, a user can recognize the eye parts 510 of the autonomous mobile object 10, and the autonomous mobile object 10 can image an external world.

Also, as illustrated in FIG. 1, FIG. 2, and FIG. 5, the autonomous mobile object 10 according to the present embodiment includes a ToF sensor 520 in a lower front part. The ToF sensor 520 has a function of detecting a distance to an object existing in front. The ToF sensor 520 can accurately detect distances to various objects, and can prevent dropping or falling by detection of a step or the like.

Also, as illustrated in FIG. 1, FIG. 3, and the like, the autonomous mobile object 10 according to the present embodiment may include a connection terminal 555 for an external device, and a power switch 560 in a back surface. The autonomous mobile object 10 can be connected to an external device via the connection terminal 555 and perform information communication.

Also, as illustrated in FIG. 5, the autonomous mobile object 10 according to the present embodiment includes two wheels 570 in a bottom surface. The wheels 570 according to the present embodiment are respectively driven by different motors 565. Accordingly, the autonomous mobile object 10 can realize moving motions such as forward movement, backward movement, turning, and rotation. Also, the wheels 570 according to the present embodiment is provided in such a manner that storing inside the main body and protrusion to the outside are possible. The autonomous mobile object 10 according to the present embodiment can also make a jumping motion by vigorous protrusion of the two wheels 570 to the outside, for example. Note that a state in which the wheels 570 are stored inside the main body is illustrated in FIG. 5.

Figure 6:
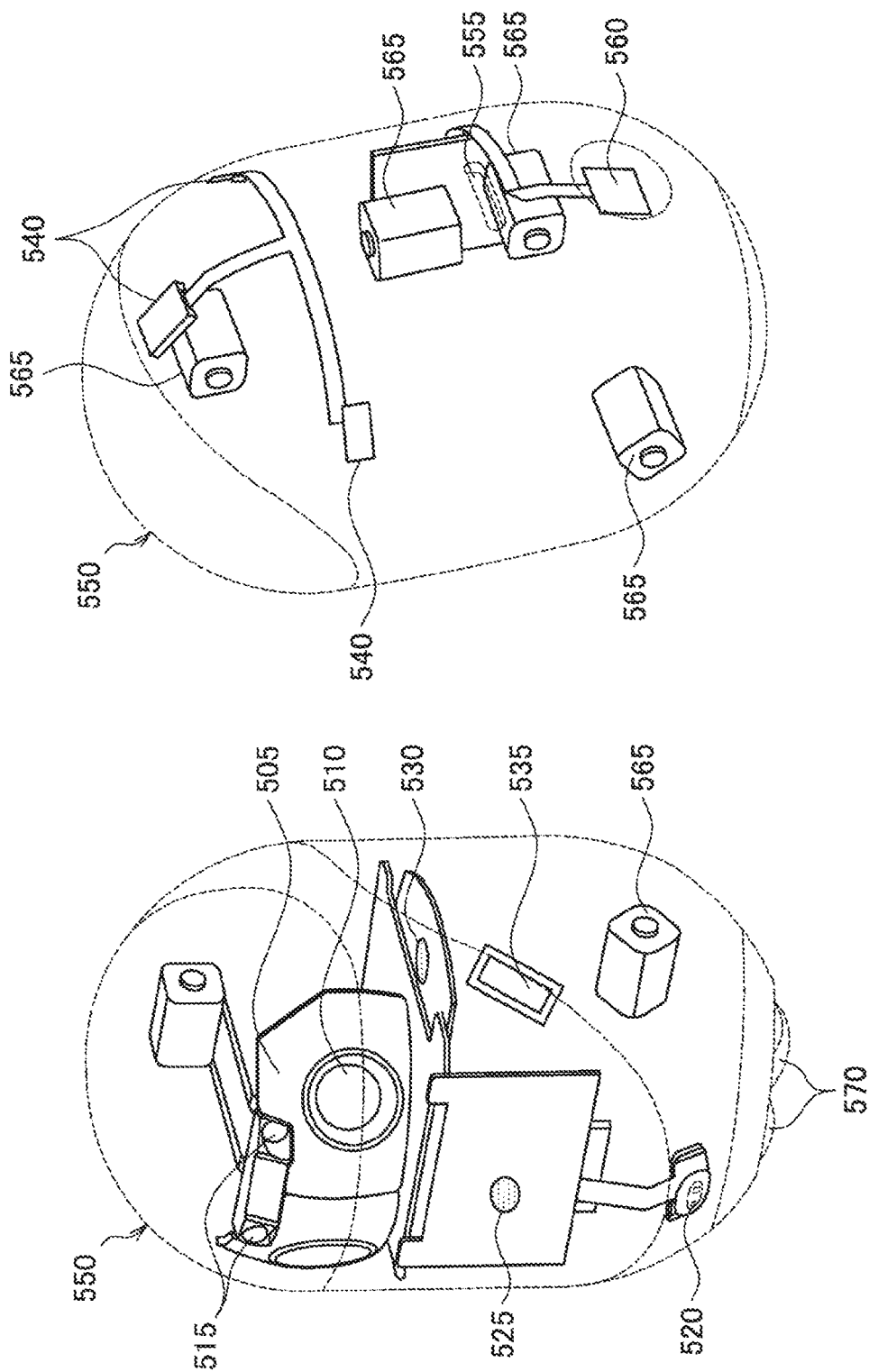
FIG. 6 is a schematic view for describing an internal structure of the autonomous mobile object according to the embodiment.

The exterior of the autonomous mobile object 10 according to the present embodiment has been described above. Next, an internal structure of the autonomous mobile object 10 according to the present embodiment will be described. FIG. 6 is a schematic view for describing the internal structure of the autonomous mobile object 10 according to the present embodiment.

As illustrated on a left side of FIG. 6, the autonomous mobile object 10 according to the present embodiment includes an inertial sensor 525 and a communication device 530 arranged on an electronic substrate. The inertial sensor 525 detects acceleration and angular velocity of the autonomous mobile object 10. Also, the communication device 530 is a configuration to realize wireless communication with the outside and includes a Bluetooth (registered trademark) or Wi-Fi (registered trademark) antenna, for example.

Also, the autonomous mobile object 10 includes, for example, a speaker 535 inside a side surface of the main body. With the speaker 535, the autonomous mobile object 10 can output various kinds of sound information including voice.

Also, as illustrated on a right side of FIG. 6, the autonomous mobile object 10 according to the present embodiment includes a plurality of microphones 540 inside an upper part of the main body. The microphones 540 collect speech of a user and an environmental sound of surroundings. Also, since the autonomous mobile object 10 includes the plurality of microphones 540, it is possible to collect a sound, which is generated in the surroundings, with high sensitivity and to realize localization of a sound source.

Also, the autonomous mobile object 10 includes a plurality of motors 565 as illustrated in FIG. 6. The autonomous mobile object 10 may include, for example, two motors 565 to drive the substrate, on which the eye parts 510 and the cameras 515 are arranged, in a perpendicular direction and a horizontal direction, two motors 565 to drive the right and left wheels 570, and one motor 565 to realize a forward-inclined attitude of the autonomous mobile object 10. The autonomous mobile object 10 according to the present embodiment can express rich motions with the plurality of motors 565.

Figure 7:
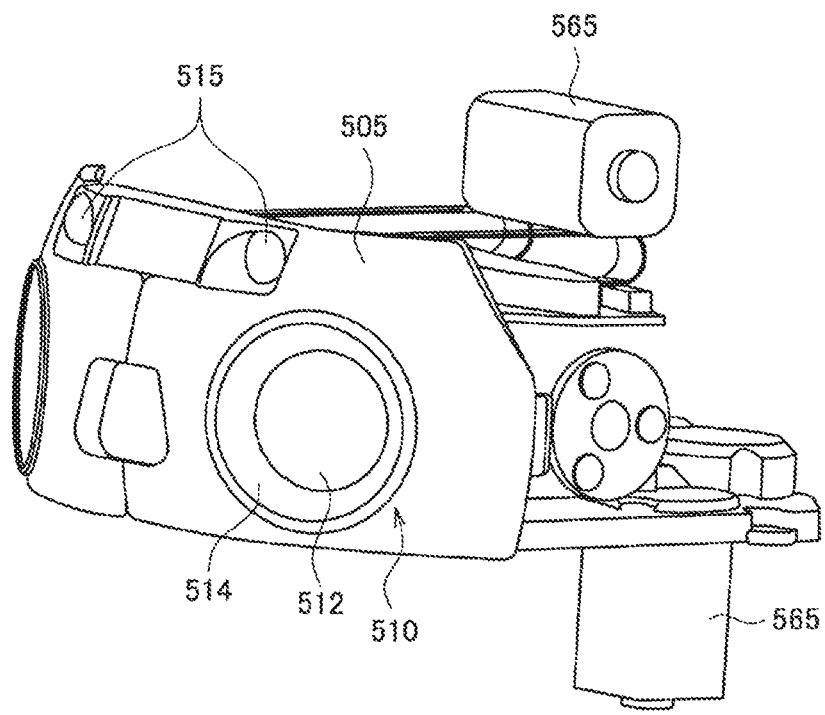
FIG. 7 is a view illustrating a configuration of a substrate according to the embodiment.
Figure 8:
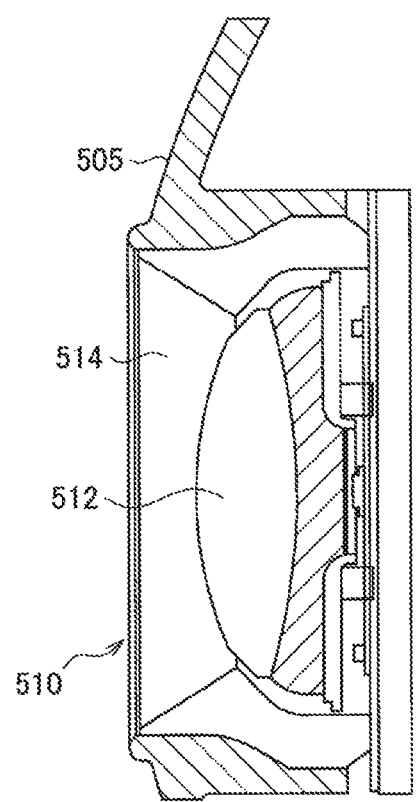
FIG. 8 is a cross-sectional view of the substrate according to the embodiment.

Next, a configuration of the substrate 505 on which the eye parts 510 and the cameras 515 are arranged and a configuration of the eye parts 510 according to the present embodiment will be described in detail. FIG. 7 is a view illustrating the configuration of the substrate 505 according to the present embodiment. FIG. 8 is a cross-sectional view of the substrate 505 according to the present embodiment. With reference to FIG. 7, the substrate 505 according to the present embodiment is connected to the two motors 565. As described above, the two motors 565 can drive, in the perpendicular direction and the horizontal direction, the substrate 505 on which the eye parts 510 and the cameras 515 are arranged. According to this, it becomes possible to flexibly move the eye parts 510 of the autonomous mobile object 10 in the perpendicular direction and the horizontal direction, and to express rich eye motions according to a situation or a motion.

Also, as illustrated in FIG. 7 and FIG. 8, each of the eye parts 510 includes a central part 512 corresponding to an iris and a peripheral part 514 corresponding to a so-called white of the eye. The central part 512 expresses an arbitrary color including blue, red, green, or the like, and the peripheral part 514 expresses white. In such a manner, the autonomous mobile object 10 according to the present embodiment can express a natural eye expression closer to that of an actual living object by separation of the configuration of the eye part 510 into two.

Figure 9:
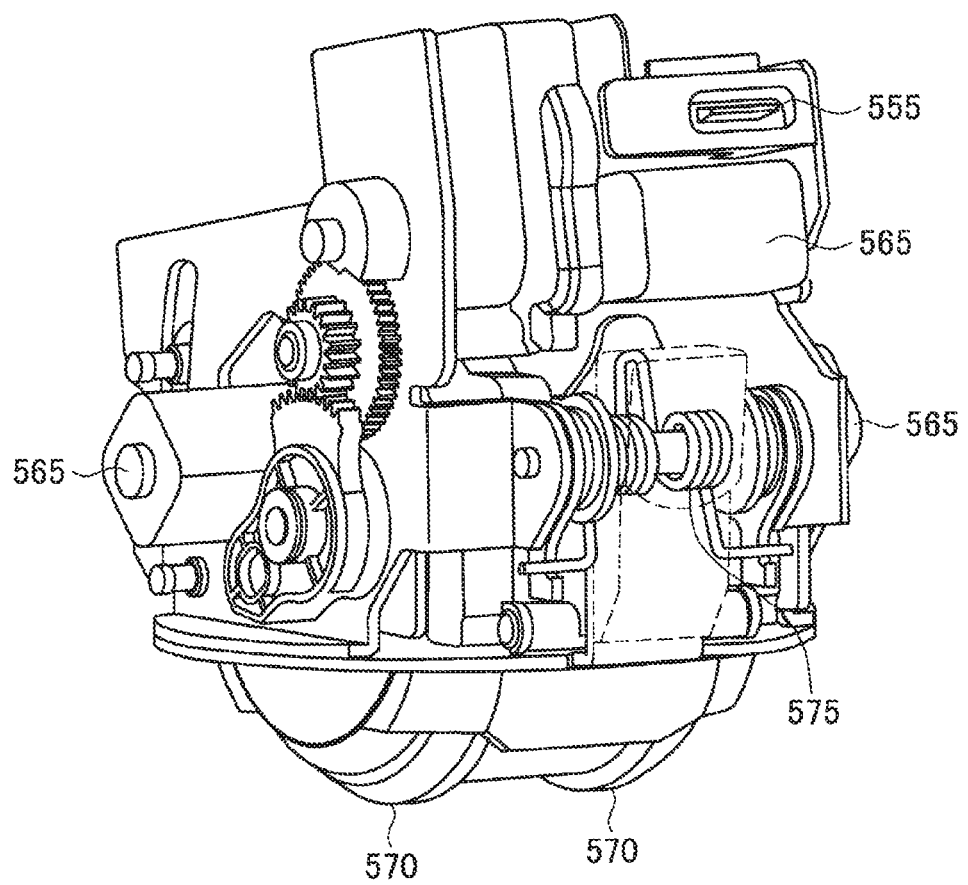
FIG. 9 is a view illustrating a peripheral structure of a wheel according to the embodiment.
Figure 10:
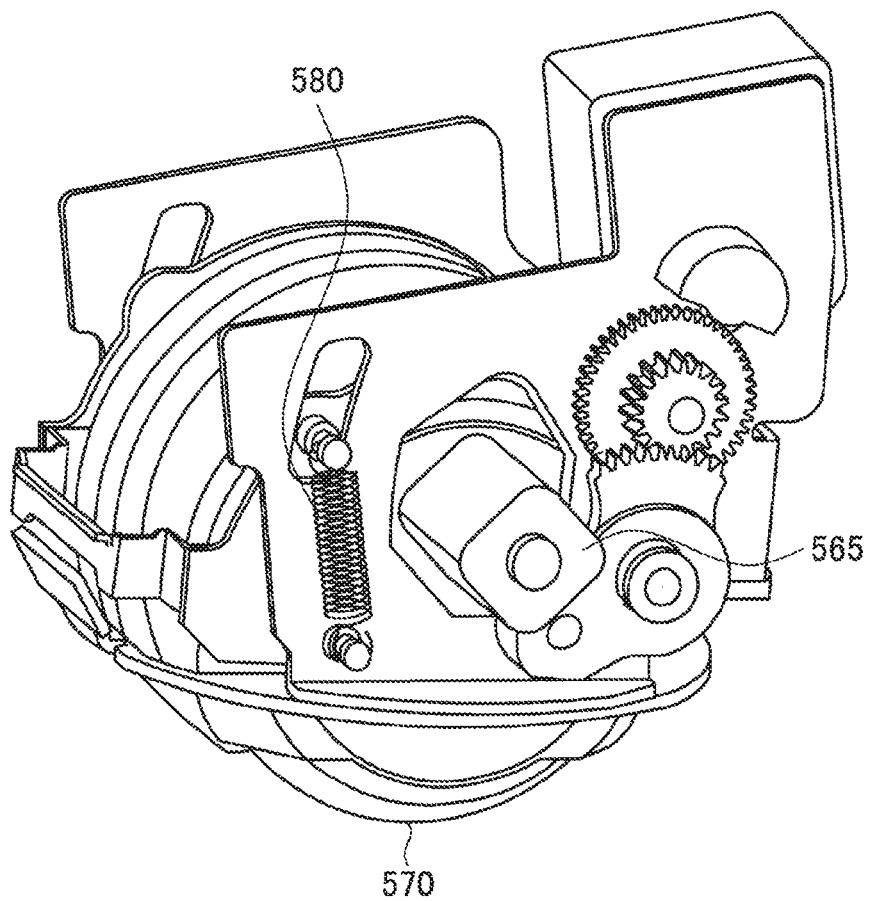
FIG. 10 is a view illustrating the peripheral structure of the wheel according to the embodiment.

Next, a structure of the wheels 570 according to the present embodiment will be described in detail with reference to FIG. 9 and FIG. 10. FIG. 9 and FIG. 10 are views illustrating a peripheral structure of the wheels 570 according to the present embodiment. As illustrated in FIG. 9, the two wheels 570 according to the present embodiment are respectively driven by independent motors 565. According to such a configuration, it is possible to delicately express a moving motion such as turning, or rotating at a place in addition to simple forward movement and backward movement.

Also, as described above, the wheels 570 according to the present embodiment are provided in such a manner that storing inside the main body and protrusion to the outside are possible. Also, by providing a damper 575 coaxially with the wheels 570 according to the present embodiment, it is possible to effectively reduce transmission of impact and vibration to an axle and the main body.

Also, as illustrated in FIG. 10, an auxiliary spring 580 may be provided in each of the wheels 570 according to the present embodiment. Driving the wheels according to the present embodiment requires torque the most among driving units included in the autonomous mobile object 10. However, with the auxiliary springs 580, all of the driving units can use a common motor 565 instead of respectively using different motors 565.

Figure 11:
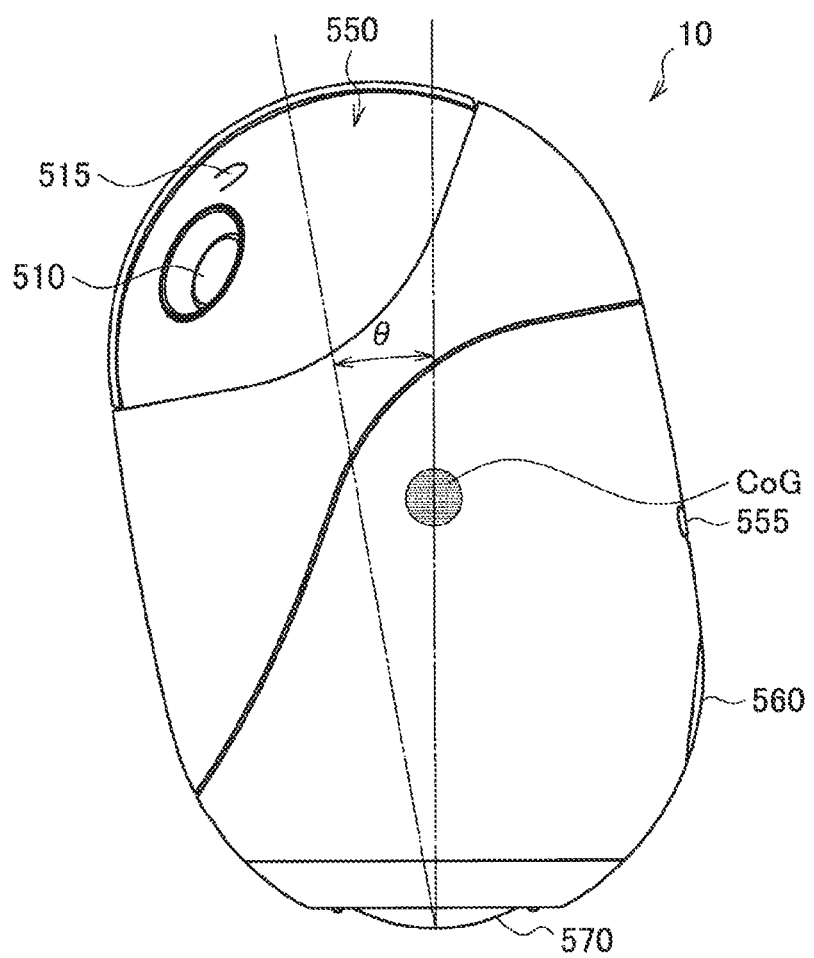
FIG. 11 is a view for describing forward-inclined traveling of the autonomous mobile object according to the embodiment.

Next, features of the autonomous mobile object 10 according to the present embodiment during traveling will be described. FIG. 11 is a view for describing forward-inclined traveling of the autonomous mobile object 10 according to the present embodiment. One of the features of the autonomous mobile object 10 according to the present embodiment is to make moving motions such as forward/backward movement, turning movement, and rotational movement while keeping a forward-inclined attitude. In FIG. 11, a state in which the autonomous mobile object 10 during traveling is seen from a side is illustrated.

As illustrated in FIG. 11, one of the features of the autonomous mobile object 10 according to the present embodiment is to make a moving motion while being inclined forward for an angle θ in the perpendicular direction. The angle θ may be 10°, for example.

Figure 12:
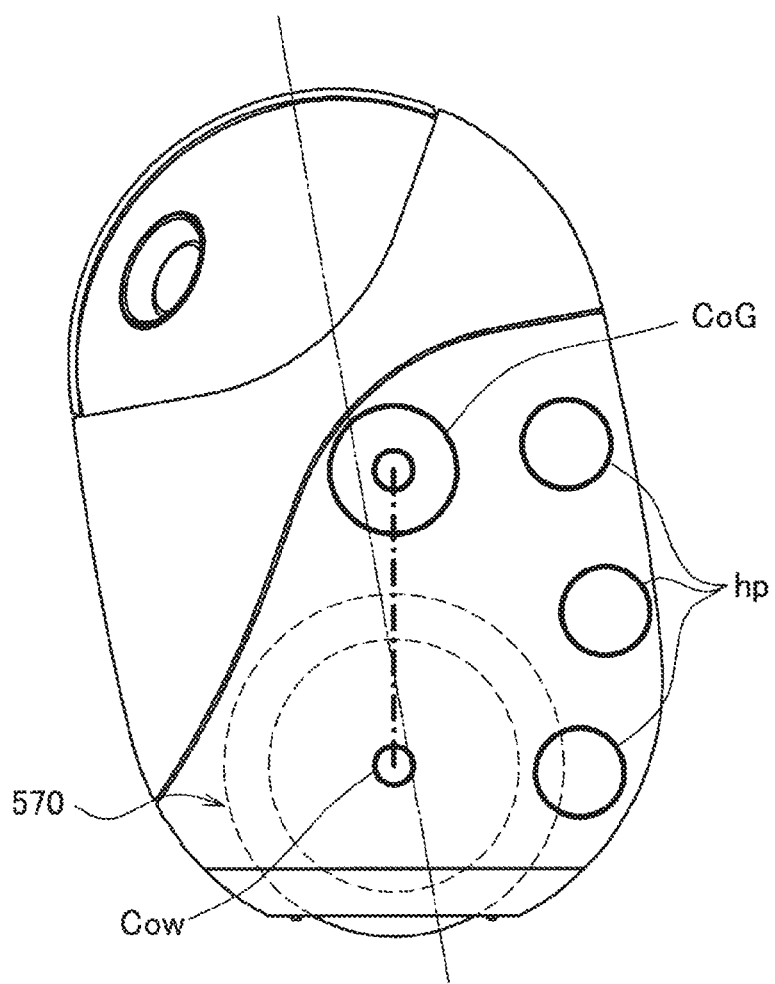
FIG. 12 is a view for describing the forward-inclined traveling of the autonomous mobile object according to the embodiment.

Here, as illustrated in FIG. 12, the motion control unit 160 (described later) controls the moving motion of the autonomous mobile object 10 in such a manner that a center of gravity CoG of the autonomous mobile object 10 is placed in a vertical direction with respect to a rotation axis CoW of the wheels 570. Also, a heavy part hp is arranged on a back side of the autonomous mobile object 10 according to the present embodiment in order to keep balance during the forward-inclined attitude. The heavy part hp according to the present embodiment may be a part that is more important than the other components included in the autonomous mobile object 10 and may be a motor 565, a battery, or the like, for example. According to the above part arrangement, gyro control in a state in which balance is kept becomes easy even when a head is inclined forward, and it is possible to prevent an unintended fall of the autonomous mobile object 10 and to realize stable forward-inclined traveling.

Figure 13B:
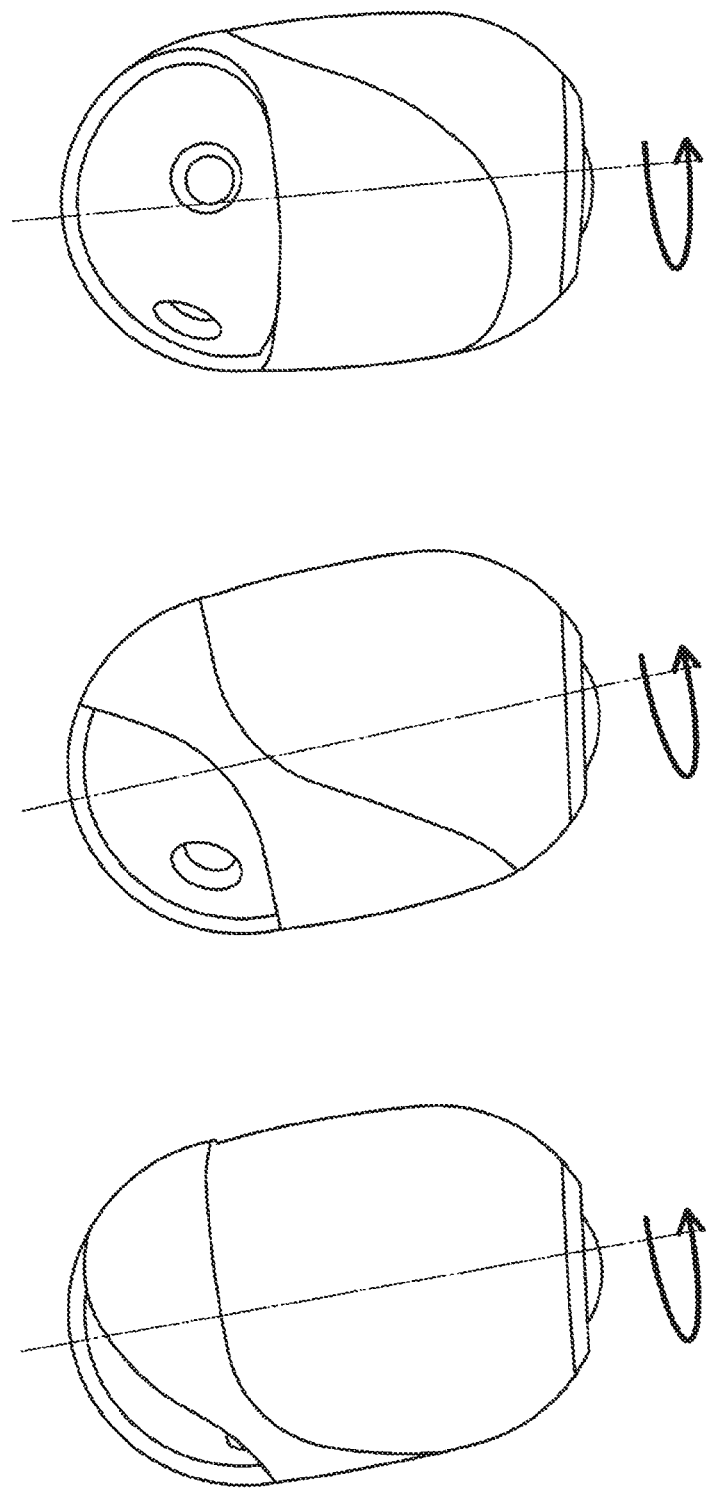
FIG. 13B is a view for describing an effect of the forward-inclined motion of the autonomous mobile object 10 according to the embodiment.

Next, the moving motion, in which a forward-inclined attitude is kept, by the autonomous mobile object 10 according to the present embodiment will be described in more detail. FIG. 13A and FIG. 13B are views for describing an effect of the forward-inclined motion of the autonomous mobile object 10 according to the present embodiment.

Here, an example of a rotating motion of a case where the autonomous mobile object does not have a forward-inclined attitude is illustrated in FIG. 13A. As illustrated in FIG. 13A, in a case where the autonomous mobile object 10 does not have the forward-inclined attitude and makes a moving motion such as rotation or forward/backward movement with the long ellipse body kept standing upright, directionality is not felt from the long ellipse body and an impression that the autonomous mobile object is an artificial object cannot be erased.

On the other hand, as illustrated in FIG. 13B, one of the features of the autonomous mobile object 10 according to the present embodiment is to make a moving motion such as rotation in a state in which a forward-inclined attitude is kept. According to such a feature, an upper front part of the autonomous mobile object 10 evokes a head and a lower back part evokes a hip, whereby directionality is generated even in the simple long ellipse body.

In such a manner, according to the forward-inclined motion of the autonomous mobile object 10 according to the present embodiment, a structure corresponding to a body part of a human can be expressed by a relatively simple exterior. By personification of a simple form, an impression as a life form beyond a mere artifact can be given to a user. As described above, the forward-inclined motion according to the present embodiment is a very effective means to make it possible to express a rich expression of a robot having a relatively simple exterior such as a long ellipse body and to evoke a complicated motion such as that of an actual living object.

In the above, a configuration example of the autonomous mobile object 10 according to an embodiment of the present disclosure has been described in detail. Note that the configuration described above with reference to FIG. 1 to FIG. 13B is just an example, and a configuration of the autonomous mobile object 10 according to an embodiment of the present disclosure is not limited to such an example. A shape and an internal structure of the autonomous mobile object 10 according to the present embodiment can be arbitrarily designed.

<<1.3. Functional Configuration Example of Autonomous Mobile Object 10>>

Figure 14:
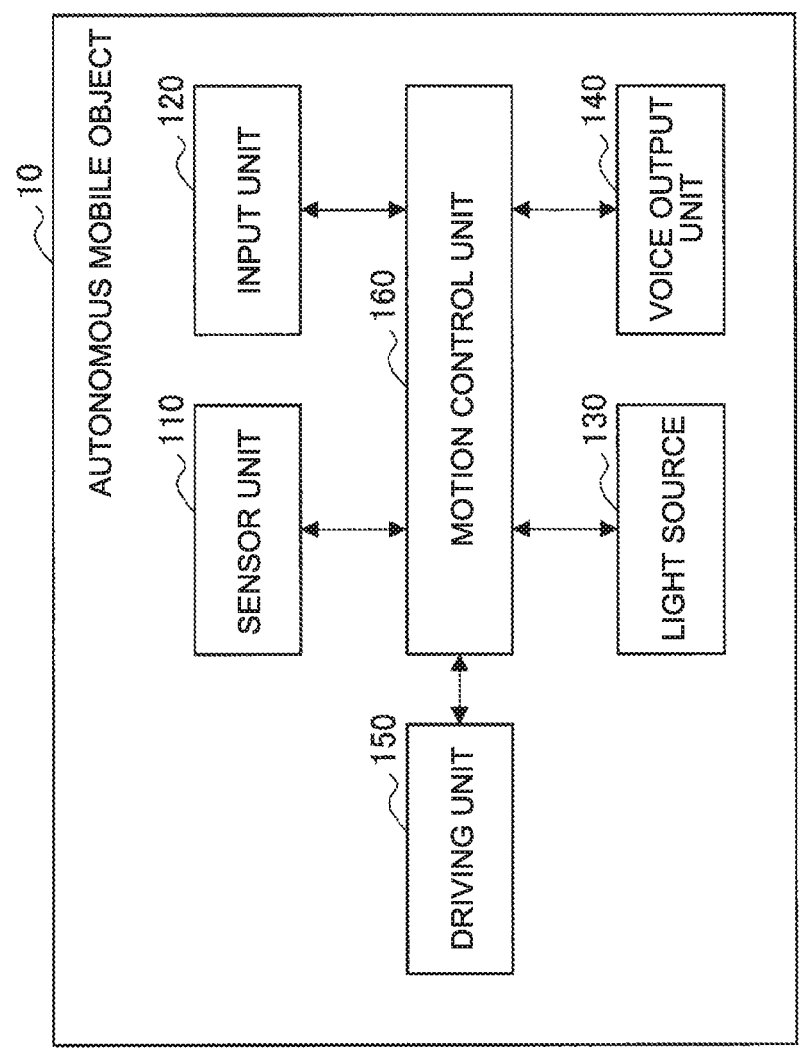
FIG. 14 is a block diagram illustrating a functional configuration example of the autonomous mobile object according to the embodiment.

Next, a functional configuration example of the autonomous mobile object 10 according to an embodiment of the present disclosure will be described. FIG. 14 is a block diagram illustrating a functional configuration example of the autonomous mobile object 10 according to the present embodiment. With reference to FIG. 14, the autonomous mobile object 10 according to the present embodiment includes a sensor unit 110, an input unit 120, a light source 130, a voice output unit 140, a driving unit 150, and a motion control unit 160.

(Sensor Unit 110)

The sensor unit 110 according to the present embodiment has a function of collecting various kinds of sensor information related to a user or surroundings. Thus, the sensor unit 110 according to the present embodiment, for example, includes the above-described camera 515, ToF sensor 520, microphone 540, inertial sensor 525, and the like. In addition to the above, the sensor unit 110 may include various sensors such as various optical sensors, temperature sensors, and humidity sensors including a geomagnetic sensor, a touch sensor, an infrared sensor, and the like.

(Input Unit 120)

The input unit 120 according to the present embodiment has a function of detecting a physical input operation by a user. The input unit 120 according to the present embodiment includes a button such as the power switch 560, for example.

(Light Source 130)

The light source 130 according to the present embodiment expresses an eye motion of the autonomous mobile object 10. For this purpose, the light source 130 according to the present embodiment includes two eye parts 510.

(Voice Output Unit 140)

The voice output unit 140 according to the present embodiment has a function of outputting various kinds of sound including voice. For this purpose, the voice output unit 140 according to the present embodiment includes a speaker 535, an amplifier, and the like.

(Driving Unit 150)

The driving unit 150 according to the present embodiment expresses a body motion of the autonomous mobile object 10. For this purpose, the driving unit 150 according to the present embodiment includes two wheels 570 and a plurality of motors 565.

(Motion Control Unit 160)

The motion control unit 160 according to the present embodiment has a function of controlling each configuration included in the autonomous mobile object 10. For example, the motion control unit 160 makes an action plan on the basis of the sensor information collected by the sensor unit 110, and controls an eye expression by the light source 130 and a voice output by the voice output unit 140. Also, the motion control unit 160 may control an operation of the driving unit 150 on the basis of the above action plan.

A functional configuration example of the autonomous mobile object 10 according to an embodiment of the present disclosure has been described above. Note that the above configuration described with reference to FIG. 14 is just an example, and a functional configuration of the autonomous mobile object 10 according to an embodiment of the present disclosure is not limited to such an example. For example, a motion of the autonomous mobile object 10 according to the present embodiment may be controlled by an information processing server that communicates with the autonomous mobile object 10. In this case, the autonomous mobile object 10 may transmit sensor information to the information processing server and receive a control signal from the information processing server via the communication device 530 described above. The functional configuration of the autonomous mobile object 10 according to the present embodiment can be flexibly modified according to a shape or the like of the autonomous mobile object 10.

<<1.4. Detail of Attitude Control>>

Next, the attitude control of the autonomous mobile object 10 by the motion control unit 160 according to the present embodiment will be described in detail. As described above, one of the features of the motion control unit 160 according to the present embodiment is to perform control in such a manner that the autonomous mobile object 10 makes a moving motion in a state in which a forward-inclined attitude is kept. According to the above function of the motion control unit 160 according to the present embodiment, it is possible to realize a rich motion expression closer to that of a real life form by generating directionality in the autonomous mobile object 10.

Also, the motion control unit 160 according to the present embodiment may perform different attitude control during a stop and during a moving motion. FIG. 15 is a view for describing the attitude control during a stop and during a moving motion according to the present embodiment. On a left side of FIG. 15, a case where the autonomous mobile object 10 stops at a place without making a moving motion is illustrated. Here, the motion control unit 160 according to the present embodiment may store the wheels 570 inside the main body of the autonomous mobile object 10 and make the autonomous mobile object 10 remain still in a seated state.

According to the above control by the motion control unit 160 of the present embodiment, in a case where the moving motion is not necessary, the wheels 570 are stored inside the main body and a bottom part is brought into contact with an installation surface, whereby it is possible to make the autonomous mobile object 10 remain still firmly and to prevent wobbling such as that of a general robotics device during a stop. Also, according to such control, it is possible to stabilize the autonomous mobile object 10 without gyro control, and to effectively reduce power consumption required for the gyro control.

On the other hand, a case where the autonomous mobile object makes a moving motion is illustrated on a right side of FIG. 15. Here, the motion control unit 160 according to the present embodiment protrudes the wheels 570 to the outside of the main body of the autonomous mobile object 10, keeps a standing state, and performs driving control or gyro control of the wheels 570.

Note that as described above, the motion control unit 160 makes the autonomous mobile object 10 keep a forward-inclined attitude by performing control in such a manner that a center of gravity CoG of the autonomous mobile object 10 is placed in a vertical direction with respect to the wheels 570. Note that here, the motion control unit 160 may adjust positions of the wheels 570 according to a position of the center of gravity CoG.

According to the above control by the motion control unit 160 of the present embodiment, it is possible to make the autonomous mobile object 10 make a moving motion in a state in which the forward-inclined attitude is kept, and it becomes possible to realize a rich motion expression closer to that of a real life form even in a case where the autonomous mobile object 10 has a relatively simple outer shape.

Note that a case where the autonomous mobile object 10 keeps the forward-inclined attitude even in the seated state has been illustrated in the example illustrated in FIG. 15. However, an attitude in the seated state according to the present embodiment is not limited to such an example. FIG. 16 is a view illustrating an example of a case where the autonomous mobile object 10 according to the present embodiment has an upright attitude in the seated state. In a case of the example illustrated in FIG. 16, it is understood that an angle of a bottom part is formed to be perpendicular to a body axis of the main body. In such a manner, an attitude of the autonomous mobile object 10 in the seated state can be arbitrarily adjusted by a change in an angle of the bottom part.

Note that as illustrated in FIG. 15, in a case where the angle of the bottom part is inclined with respect to the body axis in such a manner that a front side is opened, it is possible to further reduce a possibility that a lower front part comes into contact with a traveling surface during a moving motion. On the other hand, as illustrated in FIG. 16, in a case where the angle of the bottom part is formed perpendicularly with respect to the body axis, an effect of making the autonomous mobile object 10 remain still more stably in the seated state is expected.

However, in this case, as illustrated on a left side of FIG. 16, a center of gravity CoG of the autonomous mobile object 10 is deviated from a rotation axis of the wheels 570 in the seated state. Here, in a case where no control is performed, the main body of the autonomous mobile object 10 moves backward due to the center of gravity CoG at a moment of a transition to the standing state.

In order to prevent such a situation described above, the motion control unit 160 according to the present embodiment may rotate the wheels 570 on the basis of an amount of deviation between the center of gravity CoG of the autonomous mobile object 10 in the vertical direction and the rotation axis of the wheels 570 in the transition from the seated state to the standing state.

Figure 17:
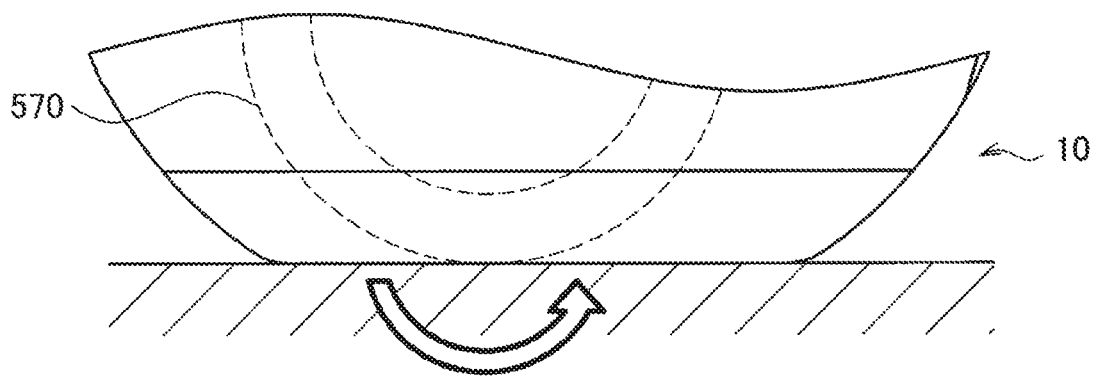
FIG. 17 is a view for describing wheel control during a transition to a position state according to the embodiment.

FIG. 17 is a view for describing wheel control in a transition to the standing state according to the present embodiment. FIG. 17 is a view illustrating a situation in which the wheels 570 of the autonomous mobile object 10 come into contact with a traveling surface by the protrusion. Here, the motion control unit 160 according to the present embodiment may perform the gyro control after rotating the wheels 570 for the above deviation amount+α and placing the center of gravity CoG in the vertical direction with respect to the rotation axis of the wheels 570. According to the above control by the motion control unit 160, even in a case where a deviation is generated between the center of gravity and the rotation axis of the wheels 570 in the seated state, it becomes possible to cancel the deviation and to make the autonomous mobile object 10 transition to the standing state stably without moving backward.

Figure 18:
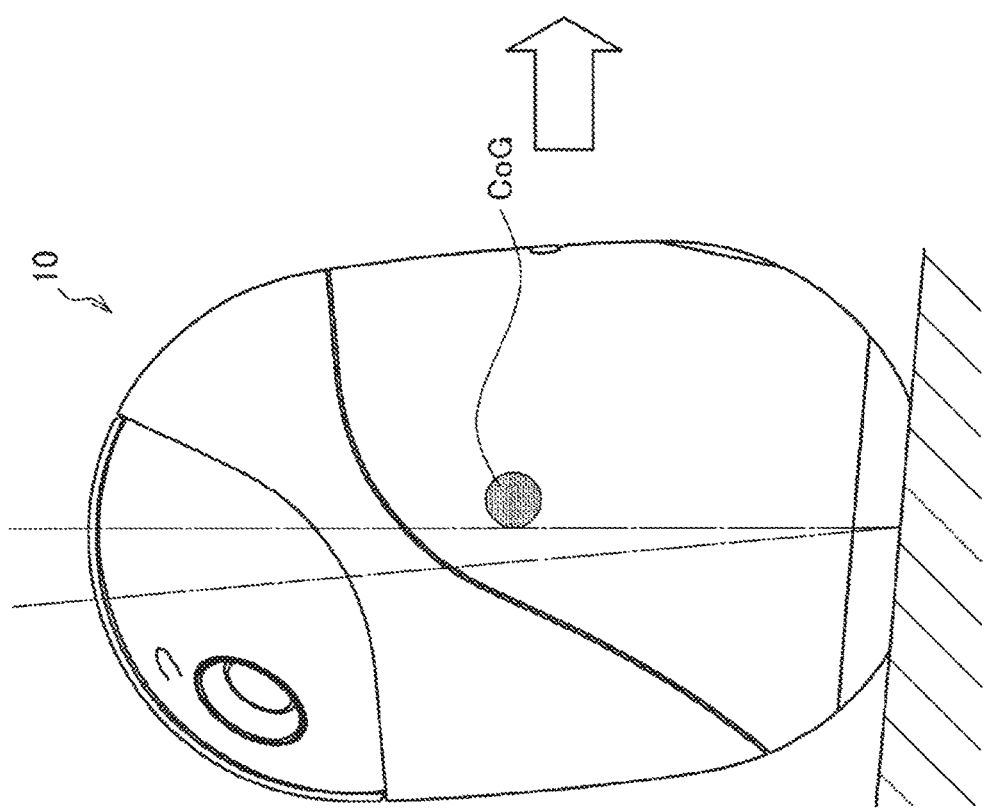
FIG. 18 is a view for describing the wheel control during the transition to the position state according to the embodiment.

Note that a case where the bottom part is formed perpendicularly with respect to the body axis and a deviation is generated between the center of gravity and the rotation axis has been described as an example in the above. However, such a deviation described above may be also generated in a case where the traveling surface has an inclination as illustrated in FIG. 18. In a case of an example illustrated in FIG. 18, an angle of the bottom part is similar to that in the example illustrated in FIG. 15. However, the center of gravity CoG in the seated state is deviated from the rotation axis of the wheels 570 since the traveling surface is inclined.

However, as described with reference to FIG. 17, even in this case, when the motion control unit 160 rotates the wheels 570 on the basis of the amount of deviation between the center of gravity CoG in the vertical direction and the rotation axis of the wheels 570, it is possible to make the autonomous mobile object 10 stably transition to the standing state without backward movement.

The attitude control in the seated state and the standing state according to the present embodiment has been described above. Next, attitude control using a flywheel according to the present embodiment will be described. In addition to the configuration described above, the autonomous mobile object 10 according to the present embodiment may further include a flywheel 610. The motion control unit 160 according to the present embodiment can more accurately realize attitude control of the autonomous mobile object 10 by using a gyro effect generated by a rotation of the flywheel 610.

Figure 19:
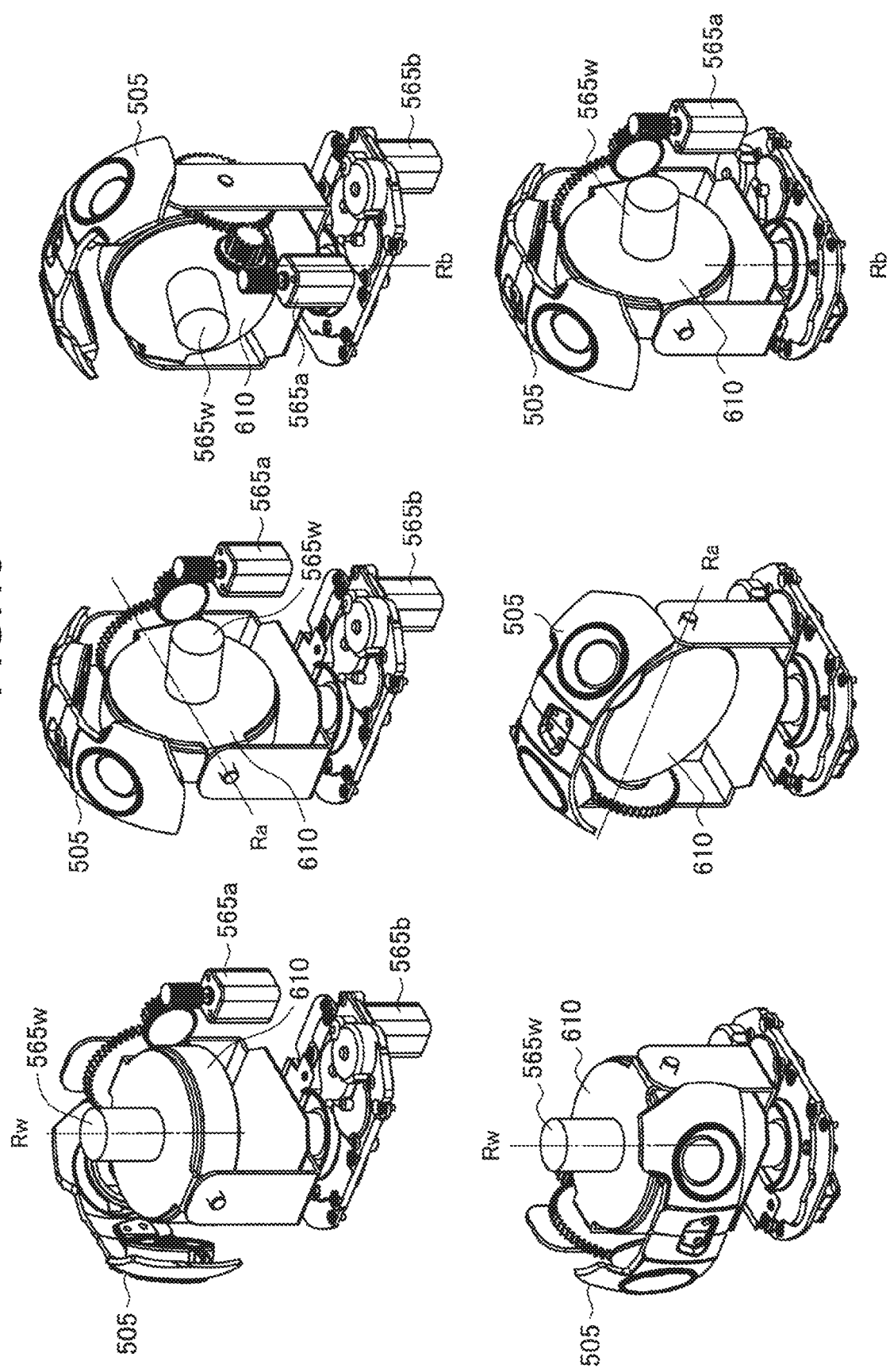
FIG. 19 is a view for describing an arrangement of a flywheel according to the embodiment.

FIG. 19 is a view for describing an arrangement of the flywheel 610 according to the present embodiment. In FIG. 19, a positional relationship between the flywheel and the substrate 505 according to the present embodiment is illustrated from various angles. As illustrated in FIG. 19, the flywheel 610 according to the present embodiment is arranged inside the substrate 505 on which the eye parts 510 and the cameras 515 are arranged. Here, the flywheel 610 according to the present embodiment may be arranged on a gimbal, which is in conjunction with the substrate 505, in such a manner as to have three rotation axes.

A rotation axis Rw illustrated on a left side of FIG. 19 is an axis for rotating the flywheel 610 at high speed. The motion control unit 160 according to the present embodiment can rotate the flywheel 610 at high speed by driving a motor 565w, and can keep an attitude of the autonomous mobile object 10 more stably by the generated gyro effect.

Also, a rotation axis Ra illustrated in the center of FIG. 19 is an axis for rotating the flywheel 610 in a tilt direction in conjunction with the substrate 505. The motion control unit 160 according to the present embodiment can incline the substrate 505 and the flywheel, which rotates at high speed, in the tilt direction and can generate large rotational force by the gyro effect by driving a motor 565a.

Also, a rotation axis Rb illustrated on a right side of FIG. 19 is an axis for rotating the flywheel 610 in a pan direction in conjunction with the substrate 505. The motion control unit 160 according to the present embodiment can adjust a direction of the substrate 505 and the flywheel 610 in the pan direction by driving a motor 565b. According to such control, a direction in which rotational force by the gyro effect is generated can be set to an arbitrary direction.

The arrangement of the flywheel 610 according to the present embodiment has been described above. Next, a return from a fall state by utilization of the flywheel 610 according to the present embodiment will be described. As described above, the motion control unit 160 according to the present embodiment can generate large rotational force by the gyro effect by making the flywheel 610 rotate at high speed and inclining, in the tilt direction, the flywheel 610 that rotates at high speed.

Figure 20:
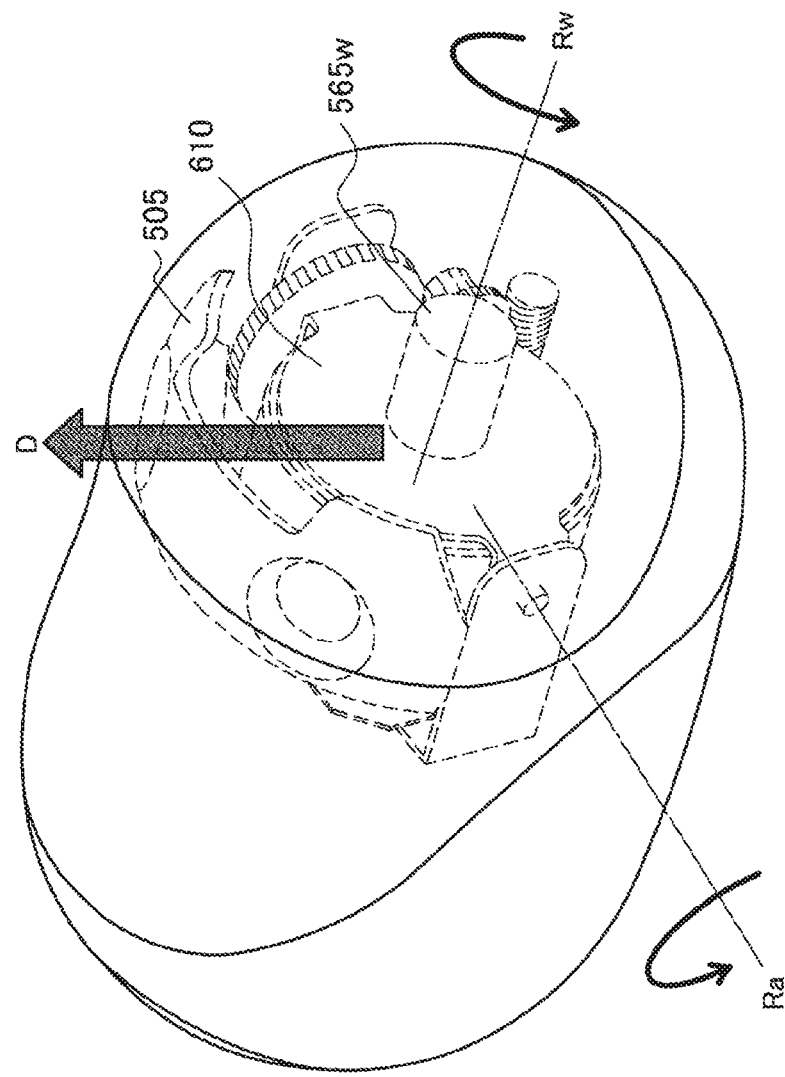
FIG. 20 is a view for describing rotational force generated by a gyro effect of the flywheel according to the embodiment.

FIG. 20 is a view for describing the rotational force generated by the gyro effect of the flywheel 610 according to the present embodiment. In a case of performing attitude control using the rotational force, the motion control unit 160 first rotates the flywheel 610 around the rotation axis Rw at high speed and keeps a large angular momentum.

Next, the motion control unit 160 according to the present embodiment generates large rotational force by the gyro effect by inclining the flywheel 610, which rotates at high speed, in the tilt direction around the rotation axis Ra. Here, a direction D in which the rotational force is generated by the gyro effect is perpendicular to the rotation axes Rw and Ra, as illustrated in FIG. 20. For example, the motion control unit 160 according to the present embodiment can return the autonomous mobile object 10 in the fall state to the standing state by using the rotational force generated in the above manner.

Figure 21:
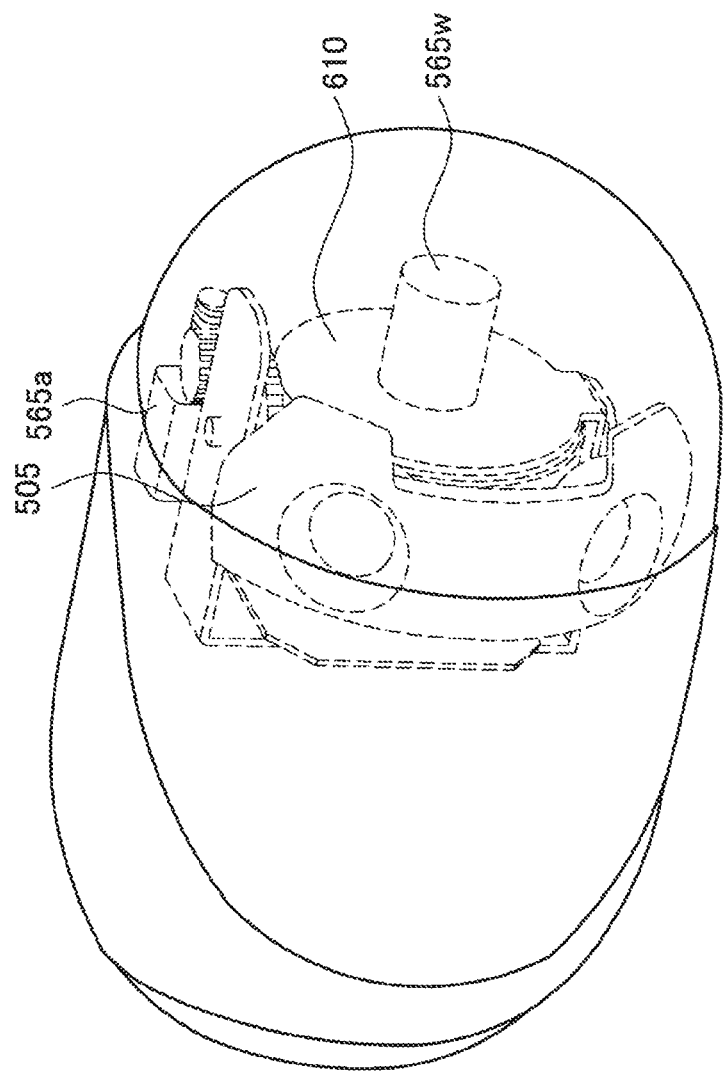
FIG. 21 is a view for describing a flow of return control from a fall state according to the embodiment.

FIG. 21 to FIG. 24 are views for describing a flow of return control from the fall state according to the present embodiment. FIG. 21 is a view illustrating an example of a case where the autonomous mobile object 10 falls sideways. In this case, the motion control unit 160 detects a direction of the autonomous mobile object 10 in the fall state on the basis of sensor information collected by the sensor unit 110.

Figure 22:
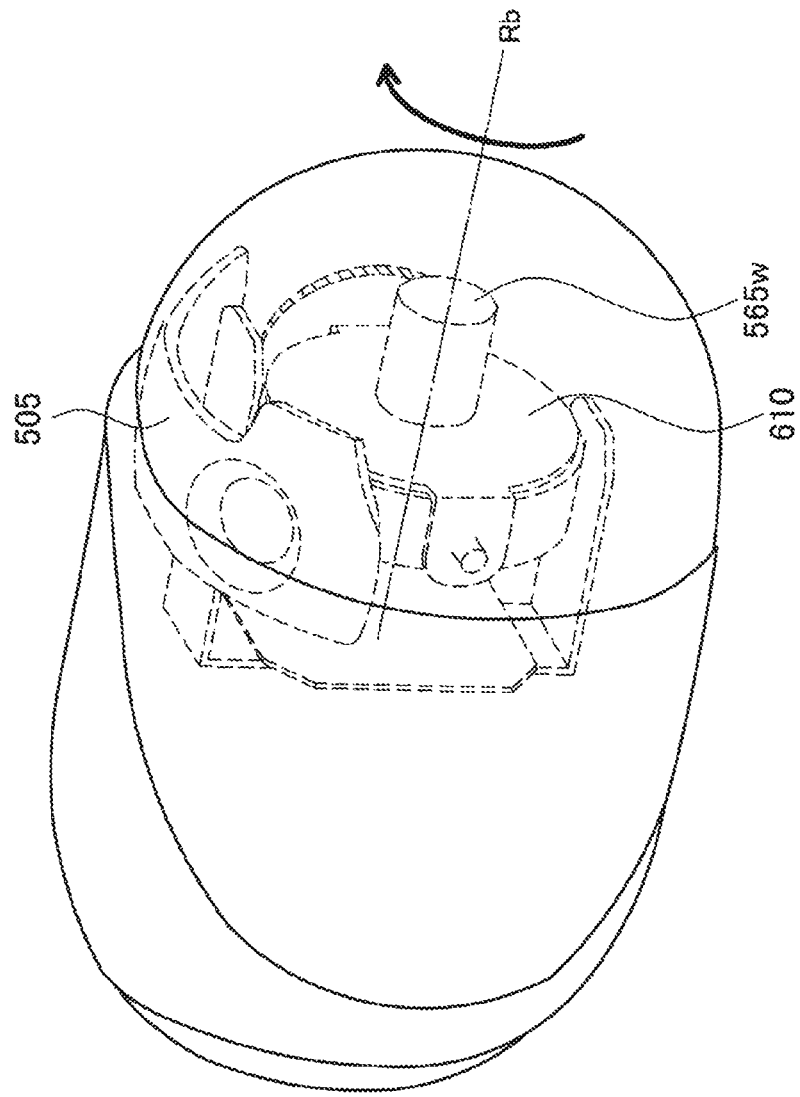
FIG. 22 is a view for describing the flow of the return control from the fall state according to the embodiment.

Next, on the basis of the direction detected above, the motion control unit 160 drives the motor 565b and rotates the substrate 505 and the flywheel 610 in the pan direction around the rotation axis Rb in such a manner that the substrate 505 faces a rising direction, as illustrated in FIG. 22. That is, the motion control unit 160 can adjust the direction, in which the rotational force is generated by the gyro effect, by inclining the flywheel 610 in the pan direction. According to such control, it is possible to return the autonomous mobile object 10 to the standing state in a mechanically correct position regardless of a direction in which the autonomous mobile object 10 falls.

Figure 23:
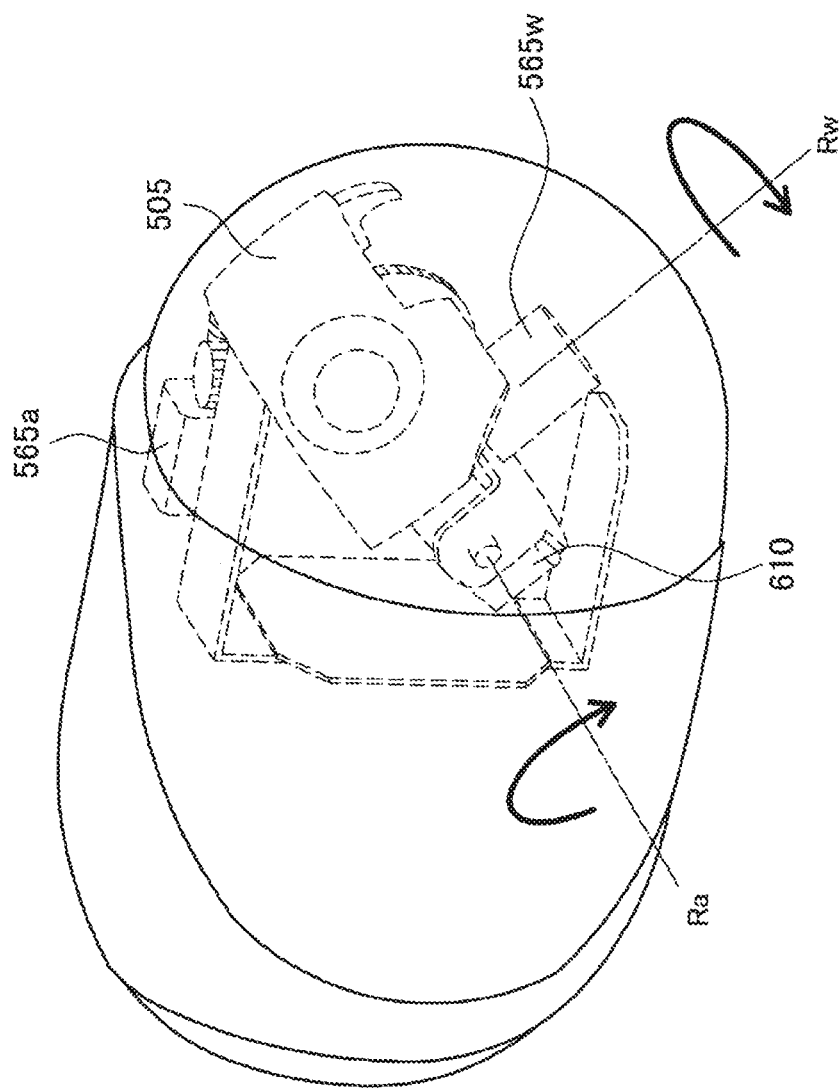
FIG. 23 is a view for describing the flow of the return control from the fall state according to the embodiment.

Next, the motion control unit 160 drives the motor 565w and rotates the flywheel 610 at high speed, as illustrated in FIG. 23. Here, when a rotation speed of the flywheel 610 exceeds a threshold, the motion control unit 160 drives the motor 565a and inclines the substrate 505 and the flywheel 610 at high speed in the tilt direction around the rotation axis Ra.

Figure 24:
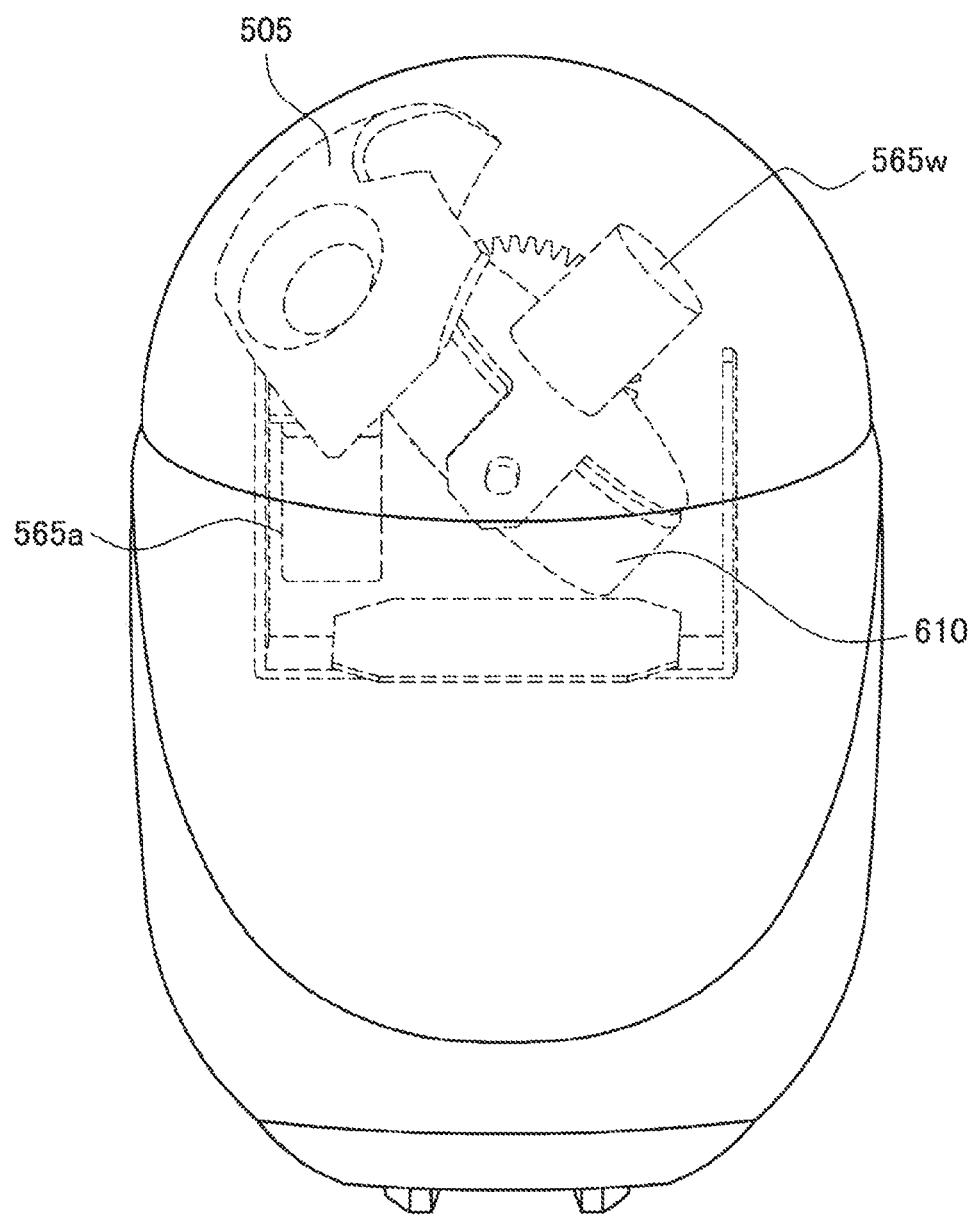
FIG. 24 is a view for describing the flow of the return control from the fall state according to the embodiment.

According to the control described above, the autonomous mobile object 10 can return from the fall state to the standing state by the rotational force by the gyro effect, as illustrated in FIG. 24.

Note that the motion control unit 160 according to the present embodiment can perform not only the above-described return from the fall state but also various kinds of motion control using the flywheel 610. For example, by using the gyro effect of the flywheel 610, the motion control unit 160 can also make the autonomous mobile object 10 remain still in a state in which the body axis thereof is substantially horizontal or return from the state to the standing state. Also, the motion control unit 160 can make the autonomous mobile object 10 execute a jump, a forward roll, a cartwheel, or the like. According to the flywheel 610 and the motion control unit 160 of the present embodiment, it is possible to realize stable attitude control of the autonomous mobile object 10 and to realize a richer motion table bottom.

2. CONCLUSION

As described above, an autonomous mobile object 10 according to an embodiment of the present disclosure includes wheels 570 that can be stored inside a main body and that can be protruded to the outside of the main body. Also, when the autonomous mobile object 10 moves, a motion control unit 160 according to an embodiment of the present disclosure keeps a standing state by making the wheels 570 protruded to the outside of the main body, and performs driving control of the wheels 570 and attitude control of the autonomous mobile object 10. Also, the motion control unit 160 makes the autonomous mobile object 10 remain still in a seated state during a stop by storing the wheels 570 inside the main body. With such a configuration, it becomes possible to realize a rich motion expression of the autonomous mobile object by easier attitude control.

In the above, preferred embodiments of the present disclosure have been described in detail with reference to the attached drawings. However, a technical scope of the present disclosure is not limited to such examples. It is obvious that a person having ordinary knowledge in the technical field of the present disclosure can come up with various modification examples or correction examples within the scope of the technical idea described in claims. It is naturally understood that these also belong to the technical scope of the present disclosure.

Also, the effects described in the present description are merely descriptive or exemplary, and are not restrictive. That is, in addition to or instead of the above effects, the technology according to the present disclosure may have a different effect obvious to those skilled in the art from description in the present description.

Note that the following configurations also belong to the technical scope of the present disclosure.

(1)

An information processing device comprising:

a motion control unit that controls a motion of an autonomous mobile object, wherein the autonomous mobile object includes a wheel that can be stored inside a main body and that can be protruded to an outside of the main body, and the motion control unit keeps a standing state by making the wheel protruded to the outside of the main body and performs driving control of the wheel and attitude control of the autonomous mobile object in movement of the autonomous mobile object, and makes the autonomous mobile object remain still in a seated state during a stop thereof by storing the wheel inside the main body.

(2)

The information processing device according to (1), wherein the motion control unit performs the attitude control in such a manner that the autonomous mobile object keeps a forward-inclined attitude in the standing state.

(3)

The information processing device according to (2), wherein the motion control unit makes the autonomous mobile object make a moving motion in a state in which the forward-inclined attitude is kept, and the moving motion includes at least one of forward/backward movement, turning movement, and rotational movement.

(4)

The information processing device according to (2) or (3), wherein the motion control unit performs control in such a manner that a center of gravity of the autonomous mobile object is placed in a vertical direction with respect to a rotation axis of the wheel in the standing state.

(5)

The information processing device according to (4), wherein the motion control unit rotates the wheel, in a transition from the seated state to the standing state, on the basis of an amount of deviation between the center of gravity of the autonomous mobile object in the vertical direction and the rotation axis.

(6)

The information processing device according to (5), wherein the motion control unit performs control, in the transition from the seated state to the standing state, in such a manner that the center of gravity of the autonomous mobile object is placed in the vertical direction with respect to the rotation axis of the wheel by rotating the wheel on the basis of the amount of deviation when the wheel comes into contact with a traveling surface.

(7)

The information processing device according to any one of (1) to (6), wherein the motion control unit makes the autonomous mobile object remain still with a forward-inclined attitude being kept in the seated state.

(8)

The information processing device according to any one of (1) to (6), wherein the motion control unit makes the autonomous mobile object remain still with an upright attitude being kept in the seated state.

(9)

The information processing device according to any one of (1) to (8), wherein the autonomous mobile object includes a flywheel inside the main body, and the motion control unit performs the attitude control of the autonomous mobile object by rotating the flywheel on the basis of an attitude state of the autonomous mobile object.

(10)

The information processing device according to (9), wherein in a case where the autonomous mobile object falls, the motion control unit makes the autonomous mobile object return to the standing state by rotation control of the flywheel.

(11)

The information processing device according to (10), wherein in a case where the autonomous mobile object falls, the motion control unit makes the autonomous mobile object return to the standing state by inclining the rotated flywheel in a tilt direction.

(12)

The information processing device according to (11), wherein in a case where the autonomous mobile object falls, the motion control unit adjusts a direction, in which rotational force of the flywheel due to a gyro effect is generated, by inclining the flywheel in a pan direction.

(13)

The information processing device according to any one of (1) to (12), wherein the information processing device is the autonomous mobile object.

(14)

An information processing method comprising:

controlling a motion of an autonomous mobile object, the controlling being performed by a processor, wherein the autonomous mobile object includes a wheel that can be stored inside a main body and that can be protruded to an outside of the main body, and the controlling further includes to keep a standing state by protruding the wheel to the outside of the main body and to perform driving control of the wheel and attitude control of the autonomous mobile object in movement of the autonomous mobile object, and to make the autonomous mobile object remain still in a seated state during a stop thereof by storing the wheel inside the main body.

(15)

A program causing a computer to function as an information processing device including a motion control unit that controls a motion of an autonomous mobile object, wherein the autonomous mobile object includes a wheel that can be stored inside a main body and that can be protruded to an outside of the main body, and the motion control unit keeps a standing state by making the wheel protruded to the outside of the main body and performs driving control of the wheel and attitude control of the autonomous mobile object in movement of the autonomous mobile object, and makes the autonomous mobile object remain still in a seated state during a stop thereof by storing the wheel inside the main body.

REFERENCE SIGNS LIST

10 AUTONOMOUS MOBILE OBJECT
110 SENSOR UNIT
120 INPUT UNIT
130 LIGHT SOURCE
140 VOICE OUTPUT UNIT
150 DRIVING UNIT
160 MOTION CONTROL UNIT
570 WHEEL
610 FLYWHEEL

The invention claimed is:

1. An information processing device comprising:
a motion control unit, implemented via at least one processor, configured to control a motion of an autonomous mobile object, wherein
the autonomous mobile object includes a wheel that can be stored inside a main body and that can be protruded to an outside of the main body,
the motion control unit is further configured to:
keep a standing state by making the wheel protruded to the outside of the main body, perform driving control of the wheel and attitude control of the autonomous mobile object while the autonomous mobile object is in motion, and make the autonomous mobile object remain still in a seated state during a stop thereof by storing the wheel inside the main body; and
rotate the wheel, in a transition from the seated state to the standing state, on a basis of an amount of deviation between a center of gravity of the autonomous mobile object and a rotation axis of the wheel.

2. The information processing device according to claim 1, wherein
the motion control unit is further configured to perform the attitude control in such a manner that the autonomous mobile object keeps a forward-inclined attitude in the standing state.

3. The information processing device according to claim 2, wherein
the motion control unit is further configured to make the autonomous mobile object make a moving motion in a state in which the forward-inclined attitude is kept, and
the moving motion includes at least one of forward/backward movement, turning movement, and rotational movement.

4. The information processing device according to claim 2, wherein
the motion control unit is further configured to perform control in such a manner that the center of gravity of the autonomous mobile object is placed in a vertical direction with respect to the rotation axis of the wheel in the standing state.

5. The information processing device according to claim 4, wherein
the motion control unit is further configured to perform control, in the transition from the seated state to the standing state, in such a manner that the center of gravity of the autonomous mobile object is placed in the vertical direction with respect to the rotation axis of the wheel by rotating the wheel on the basis of the amount of deviation when the wheel comes into contact with a traveling surface.

6. The information processing device according to claim 1, wherein
the motion control unit is further configured to make the autonomous mobile object remain still with a forward-inclined attitude being kept in the seated state.

7. The information processing device according to claim 1, wherein
the motion control unit is further configured to make the autonomous mobile object remain still with an upright attitude being kept in the seated state.

8. The information processing device according to claim 1, wherein
the autonomous mobile object includes a flywheel inside the main body, and
the motion control unit is further configured to perform the attitude control of the autonomous mobile object by rotating the flywheel on a basis of an attitude state of the autonomous mobile object.

9. The information processing device according to claim 8, wherein in a case where the autonomous mobile object falls, the motion control unit is further configured to make the autonomous mobile object return to the standing state by rotation control of the flywheel.

10. The information processing device according to claim 8, wherein in a case where the autonomous mobile object falls, the motion control unit is further configured to make the autonomous mobile object return to the standing state by inclining the rotated flywheel in a tilt direction.

11. The information processing device according to claim 8, wherein in a case where the autonomous mobile object falls, the motion control unit is further configured to adjust a direction, in which rotational force of the flywheel due to a gyro effect is generated, by inclining the flywheel in a pan direction.

12. The information processing device according to claim 1, wherein the information processing device is the autonomous mobile object.

13. An information processing method comprising:

controlling a motion of an autonomous mobile object, the controlling being performed by a processor, wherein the autonomous mobile object includes a wheel that can be stored inside a main body and that can be protruded to an outside of the main body, and the controlling further to including:

keeping a standing state by protruding the wheel to the outside of the main body, performing driving control of the wheel and attitude control of the autonomous mobile object while the autonomous mobile object is in motion, and making the autonomous mobile object remain still in a seated state during a stop thereof by storing the wheel inside the main body, and rotating the wheel, in a transition from the seated state to the standing state, on a basis of an amount of deviation between a center of gravity of the autonomous mobile object and a rotation axis of the wheel.

14. A non-transitory computer-readable medium having embodied thereon a program, which when executed by a computer causes the computer to execute an information processing method, the method comprising controlling a motion of an autonomous mobile object, wherein the autonomous mobile object includes a wheel that can be stored inside a main body and that can be protruded to an outside of the main body, and the controlling further including:

keeping a standing state by making the wheel protruded to the outside of the main body, performing driving control of the wheel and attitude control of the autonomous mobile object while the autonomous mobile object is in motion, and making the autonomous mobile object remain still in a seated state during a stop thereof by storing the wheel inside the main body; and rotating the wheel, in a transition from the seated state to the standing state, on a basis of an amount of deviation between a center of gravity of the autonomous mobile object and a rotation axis of the wheel.

* * * * *